United States Patent
Dams et al.

(10) Patent No.: US 10,106,724 B2
(45) Date of Patent: *Oct. 23, 2018

(54) METHOD OF CONTACTING HYDROCARBON-BEARING FORMATIONS WITH FLUORINATED IONIC POLYMERS

(71) Applicant: 3M INNOVATIVE PROPERTIES COMPANY, St. Paul, MN (US)

(72) Inventors: Rudolf J. Dams, Antwerp (BE); Yong K. Wu, Woodbury, MN (US); Wayne W. Fan, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 442 days.

This patent is subject to a terminal disclaimer.

(21) Appl. No.: 14/443,579

(22) PCT Filed: Nov. 19, 2013

(86) PCT No.: PCT/US2013/070765
§ 371 (c)(1),
(2) Date: May 18, 2015

(87) PCT Pub. No.: WO2014/078845
PCT Pub. Date: May 22, 2014

(65) Prior Publication Data
US 2015/0329766 A1    Nov. 19, 2015

Related U.S. Application Data

(60) Provisional application No. 61/727,883, filed on Nov. 19, 2012.

(51) Int. Cl.
| | | |
|---|---|---|
| C09K 8/584 | (2006.01) | |
| C09K 8/588 | (2006.01) | |
| C09K 8/80 | (2006.01) | |
| C09K 8/035 | (2006.01) | |
| C09K 8/60 | (2006.01) | |
| C09K 8/86 | (2006.01) | |
| C09K 8/88 | (2006.01) | |

(52) U.S. Cl.
CPC .............. *C09K 8/584* (2013.01); *C09K 8/035* (2013.01); *C09K 8/588* (2013.01); *C09K 8/604* (2013.01); *C09K 8/80* (2013.01); *C09K 8/86* (2013.01); *C09K 8/88* (2013.01)

(58) Field of Classification Search
CPC ........ C09K 8/035; C09K 8/584; C09K 8/588; C09K 8/604; C09K 8/80; C09K 8/86; C09K 8/88
See application file for complete search history.

(56) References Cited

U.S. PATENT DOCUMENTS

| | | |
|---|---|---|
| 2,803,615 A | 8/1957 | Ahlbrecht |
| 3,278,352 A | 10/1966 | Erickson |
| 3,311,167 A | 3/1967 | O'Brien |
| 3,394,758 A | 7/1968 | Terry |
| 3,553,179 A | 1/1971 | Bartlett |
| 3,653,442 A | 4/1972 | Ross |
| 3,728,151 A | 4/1973 | Sherman |
| 3,787,351 A | 1/1974 | Olson |
| 3,902,557 A | 9/1975 | Shaughnessy |
| 3,944,527 A | 3/1976 | McCown |
| 4,018,689 A | 4/1977 | Thompson |
| 4,147,851 A | 4/1979 | Raynolds |
| 4,200,154 A | 4/1980 | Tate |
| 4,329,236 A | 5/1982 | Alford |
| 4,432,882 A | 2/1984 | Raynolds et al. |

(Continued)

FOREIGN PATENT DOCUMENTS

| | | |
|---|---|---|
| CA | 2009732 | 8/1990 |
| EP | 0870778 | 10/1998 |

(Continued)

OTHER PUBLICATIONS

US 6,492,477, 12/2002, Savu (withdrawn)
Adibhatla, "Effect of Surfactants on Wettability of Near-wellbore Regions of Gas Reservoirs", Journal of Petroleum Science and Engineering, 2006, vol. 52, pp. 227-236. (XP002519991).
Al-Anazi et al., "A Successful Methanol Treatment in a Gas-Condensate Reservoir: Field Application", Mar. 2003, SPE 80901, Society of Petroleum Engineers Inc., pp. 1-9.
Clark, H. B., et al., "Use of Fluorochemical Surfactants in Nonaqueous Stimulation Fields," *Journal of Petroleum Chemistry* vol. 32, No. 10 (1980) p. 1695-1697.

(Continued)

*Primary Examiner* — Frances Tischler

(57) ABSTRACT

A method is disclosed that includes contacting a hydrocarbon-bearing formation with a treatment composition comprising solvent and a fluorinated polymer. The fluorinated polymer includes: a first divalent unit represented by formula (I): wherein Rf represents a fluoroalkyl group having from 1 to 8 carbon atoms; each $R^1$ is independently hydrogen or methyl; Q is a bond or —$SO_2$—N(R)—, wherein R is alkyl having from 1 to 4 carbon atoms; and m is an integer from 1 to 11, a second divalent unit comprising a poly (alkyleneoxy) group; and a third divalent unit comprising a pendant ionic group. The solvent includes not more than ten percent by weight methanol and not more than 25 percent by weight water, based on the total weight of the solvent, and/or the solvent solubilizes or displaces brine in the hydrocarbon-bearing formation. Treated hydrocarbon-bearing formations are also disclosed.

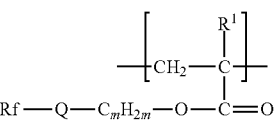

20 Claims, 3 Drawing Sheets

(56) References Cited

U.S. PATENT DOCUMENTS

| | | | |
|---|---|---|---|
| 4,440,653 A | 4/1984 | Briscoe et al. | |
| 4,460,791 A | 7/1984 | Cooke | |
| 4,557,837 A | 12/1985 | Clark, III et al. | |
| 4,565,639 A | 1/1986 | Penny et al. | |
| 4,594,200 A | 6/1986 | Penny | |
| 4,609,477 A | 9/1986 | Crema | |
| 4,702,849 A | 10/1987 | Penny | |
| 4,753,740 A | 6/1988 | Marlett et al. | |
| 4,767,545 A | 8/1988 | Karydas et al. | |
| 4,817,715 A | 4/1989 | Peru | |
| 4,823,873 A | 4/1989 | Karydas | |
| 4,921,619 A | 5/1990 | Karydas | |
| 4,923,009 A | 5/1990 | Watkins | |
| 4,993,448 A | 2/1991 | Karydas et al. | |
| 4,997,580 A | 3/1991 | Karydas et al. | |
| 5,042,580 A | 8/1991 | Cullick et al. | |
| 5,092,405 A | 3/1992 | Prukop | |
| 5,129,457 A | 7/1992 | Sydansk | |
| 5,144,069 A | 9/1992 | Stern | |
| 5,186,257 A | 2/1993 | Stahl et al. | |
| 5,247,993 A | 9/1993 | Sarem et al. | |
| 5,310,002 A | 5/1994 | Blauch et al. | |
| 5,358,052 A | 10/1994 | Gidley | |
| 5,370,919 A | 12/1994 | Fieuws | |
| 5,468,353 A | 11/1995 | Anich | |
| 5,688,884 A | 11/1997 | Baker | |
| 6,037,429 A * | 3/2000 | Linert | C04B 41/009 526/240 |
| 6,156,708 A | 12/2000 | Brookey | |
| 6,165,948 A | 12/2000 | Dewenter et al. | |
| 6,182,759 B1 | 2/2001 | Burger | |
| 6,206,102 B1 | 3/2001 | Pusch et al. | |
| 6,225,263 B1 | 5/2001 | Collins et al. | |
| 6,306,944 B1 | 10/2001 | Seki | |
| 6,365,769 B1 | 4/2002 | Behr | |
| 6,380,149 B2 | 4/2002 | Flynn | |
| 6,521,730 B1 | 2/2003 | Pabon | |
| 6,566,470 B2 | 5/2003 | Kantamneni | |
| 6,579,572 B2 | 6/2003 | Espin et al. | |
| 6,649,571 B1 | 11/2003 | Morgan et al. | |
| 6,660,693 B2 | 12/2003 | Miller et al. | |
| 6,664,354 B2 | 12/2003 | Savu et al. | |
| 6,689,854 B2 | 2/2004 | Fan et al. | |
| 6,720,371 B2 | 4/2004 | Furuta | |
| 6,729,409 B1 | 5/2004 | Gupta et al. | |
| 6,852,781 B2 | 2/2005 | Savu | |
| 6,911,417 B2 | 6/2005 | Chan et al. | |
| 6,945,327 B2 | 9/2005 | Ely et al. | |
| 6,972,274 B1 | 12/2005 | Slikta et al. | |
| 7,084,094 B2 | 8/2006 | Gunn et al. | |
| 7,087,710 B2 | 8/2006 | Medsker | |
| 7,165,613 B2 | 1/2007 | Chan et al. | |
| 7,417,099 B2 | 8/2008 | Savu et al. | |
| 7,585,817 B2 | 9/2009 | Pope et al. | |
| 7,629,298 B2 | 12/2009 | Arco et al. | |
| 7,722,955 B2 | 5/2010 | Audenaert | |
| 7,772,162 B2 | 8/2010 | Pope et al. | |
| 7,855,169 B2 | 12/2010 | Pope et al. | |
| 8,043,998 B2 | 10/2011 | Pope et al. | |
| 8,138,127 B2 | 3/2012 | Pope et al. | |
| 8,176,981 B2 | 5/2012 | Savu | |
| 8,236,737 B2 | 8/2012 | Fan | |
| 8,261,825 B2 | 9/2012 | Pope et al. | |
| 8,403,050 B2 | 3/2013 | Pope et al. | |
| 8,418,759 B2 | 4/2013 | Moore | |
| 8,476,385 B2 | 7/2013 | Dams | |
| 8,629,089 B2 | 1/2014 | Dams | |
| 8,678,090 B2 | 3/2014 | Baran, Jr. | |
| 8,701,763 B2 | 4/2014 | Baran, Jr. | |
| 8,833,449 B2 | 9/2014 | Dams | |
| 8,945,712 B2 | 2/2015 | Dams et al. | |
| 9,057,012 B2 | 6/2015 | Dams | |
| 9,200,102 B2 | 12/2015 | Baran, Jr. | |
| 9,353,309 B2 | 5/2016 | Pope et al. | |
| 9,499,737 B2 | 11/2016 | Baran, Jr. | |

| | | | |
|---|---|---|---|
| 2003/0092581 A1 | 5/2003 | Crews | |
| 2004/0185013 A1 | 9/2004 | Burgio | |
| 2005/0124738 A1 | 6/2005 | Sivik | |
| 2005/0244641 A1 | 11/2005 | Vincent | |
| 2006/0045979 A1 | 3/2006 | Dams | |
| 2006/0149012 A1 | 7/2006 | Terrazas | |
| 2006/0264334 A1 | 11/2006 | Gupta et al. | |
| 2007/0015669 A1 | 1/2007 | Zhang | |
| 2007/0029085 A1 | 2/2007 | Panga et al. | |
| 2007/0123430 A1 | 5/2007 | Pasquier | |
| 2009/0149616 A1 | 6/2009 | Audenaert | |
| 2009/0281002 A1 | 11/2009 | Casper | |
| 2010/0167964 A1* | 7/2010 | Pope | C09K 8/604 507/205 |
| 2010/0181068 A1 | 7/2010 | Pope et al. | |
| 2010/0224361 A1 | 9/2010 | Pope et al. | |
| 2010/0270019 A1 | 10/2010 | Pope et al. | |
| 2010/0270020 A1 | 10/2010 | Baran, Jr. | |
| 2010/0276142 A1 | 11/2010 | Skildum et al. | |
| 2010/0288408 A1 | 11/2010 | Ohashi | |
| 2011/0124532 A1 | 5/2011 | Maurer | |
| 2011/0136704 A1 | 6/2011 | Sharma | |
| 2011/0201531 A1 | 8/2011 | Sharma | |
| 2012/0071372 A1 | 3/2012 | Iaconelli | |
| 2013/0269932 A1 | 10/2013 | Dams | |
| 2014/0014330 A1 | 1/2014 | Dams | |
| 2015/0299506 A1 | 10/2015 | Fan | |

FOREIGN PATENT DOCUMENTS

| | | |
|---|---|---|
| EP | 1311637 | 5/2003 |
| GB | 2031482 | 4/1980 |
| JP | 2014-051863 | 3/2014 |
| RU | 1706204 | 11/1994 |
| WO | WO 2002-090402 | 11/2002 |
| WO | WO 2003/089540 | 10/2003 |
| WO | WO 2005/028589 A1 | 3/2005 |
| WO | WO 2005/035936 A1 | 4/2005 |
| WO | WO 2007/017806 | 2/2007 |
| WO | WO 2007/033489 | 3/2007 |
| WO | WO 2007/097975 | 8/2007 |
| WO | WO 2010/132333 | 11/2010 |
| WO | WO 2010/132362 | 11/2010 |
| WO | WO 2010/144352 | 12/2010 |
| WO | WO 2010/144398 | 12/2010 |
| WO | WO 2011/005666 | 1/2011 |
| WO | WO 2011-120735 | 10/2011 |

OTHER PUBLICATIONS

Crema et al., "Foaming of Anhydrous Methanol for Well Stimulation", Apr. 1985, SPE 13565, Society of Petroleum Engineers Inc., 4 pages.

Fahes, "Wettability Alteration to Intermediate Gas-Wetting in Gas-Condensate Reservoirs at High Temperatures", Oct. 9-12, 2005, SPE Annual Technical Conference and Exhibition, Dallas, TX, pp. 1-14. SPE 96184.

Fahimpour, J. et al., "Optimization of Fluorinated Wettability Modifiers for Gas-Condensate Carbonate Reservoirs", Jun. 4-7, 2012, SPE Europec/EAGE Annual Conference, Copenhagen, Denmark, abstract of SPE-154522 found at http://www.onepetro.org, 2 pages.

Fahimpour, J. et al. "Performance of Fluorochemicals on Wettability Alteration of Carbonate Rocks to Alleviate Condensate/Water Banking", Aug. 27-30, 2012, International Symposium of the Society of Core Analysts held in Aberdeen, Scotland, UK, SCA 2012-21, 12 pages.

Kumar, "Improving the Gas and Condensate Relative Permeability Using Chemical Treatments", May 15-17, 2006, SPE Gas Technology Symposium, Calgary, Alberta, pp. 1-9. SPE 100529.

McLeod, "The Use of Alcohol in Gas Well Stimulation", Nov. 10-11, 1966, SPE Eastern Regional Meeting, Columbus, Ohio, pp. 1-13. SPE 1663.

Noh et al., "Effect of Wettability on High-Velocity Coefficient in Two-Phase Gas-Liquid Flow", SPE 102773, 2006 SPE Annual Technical Conference and Exhibition held in San Antonio, TX, Sep. 24-27, 2006.

(56) References Cited

OTHER PUBLICATIONS

Panga, "Preventive Treatment for Enhancing Water Removal from Gas Reservoirs by Wettability Alteration", Mar. 11-14, 2007, 15th SPE Middle East Oil & Gas Show and Conference, Kingdom of Bahrain, pp. 1-12. SPE 105367.
Tang, "Relative Permeability Modification in Gas/Liquid Systems Through Wettability Alteration to Intermediate Gas Wetting", SPE Reservoir Evaluation and Engineering, Dec. 2002, vol. 5, No. 6, pp. 427-436. SPE 81195.
Karsa, "Industrial Applications of Surfactants", 4 Pages, 1987.
Banks, "Organofluorine Chemicals and Their Industrial Applications", pp. 226-234, 1979.
International Search Report for PCT International Application No. PCT/US2013/070765 dated Feb. 27, 2014, 3 pages.

\* cited by examiner

METHOD OF CONTACTING HYDROCARBON-BEARING FORMATIONS WITH FLUORINATED IONIC POLYMERS

CROSS REFERENCE TO RELATED APPLICATION

This application is a national stage filing under 35 U.S.C. 371 of PCT/US2013/070765, filed Nov. 19, 2013, which claims priority to U.S. Provisional Application No. 61/727,883, filed Nov. 19, 2012, the disclosure of which is incorporated by reference in its entirety herein.

BACKGROUND

In the oil and gas industry, certain surfactants (including certain fluorinated surfactants) are known as fluid additives for various downhole operations (e.g., fracturing, water-flooding, and drilling). Often, these surfactants function to decrease the surface tension of the fluid or to stabilize foamed fluids.

Some hydrocarbon and fluorochemical compounds have been used to modify the wettability of reservoir rock, which may be useful, for example, to prevent or remedy water blocking (e.g., in oil or gas wells) or liquid hydrocarbon accumulation (e.g., in gas wells) in the vicinity of the wellbore (i.e., the near wellbore region). Water blocking and liquid hydrocarbon accumulation may result from natural phenomena (e.g., water-bearing geological zones or condensate banking) and/or operations conducted on the well (e.g., using aqueous or hydrocarbon fluids). Water blocking and condensate banking in the near wellbore region of a hydrocarbon-bearing geological formation can inhibit or stop production of hydrocarbons from the well and hence are typically not desirable. Not all hydrocarbon and fluorochemical compounds, however, provide the desired wettability modification. And some of these compounds modify the wettability of siliciclastic hydrocarbon-bearing formations but not carbonate formations, or vice versa.

Solvent injection (e.g., injection of methanol) has been used to alleviate the problems of water blocking and condensate banking in gas wells, but this method may provide only a temporary benefit, and may not be desirable under some downhole conditions.

SUMMARY

Methods of treating a hydrocarbon-bearing formation disclosed herein may be useful, for example, for increasing the permeability in hydrocarbon-bearing formations wherein two phases (i.e., a gas phase and an oil phase) of the hydrocarbons are present, (e.g., in gas wells having retrograde condensate and oil wells having black oil or volatile oil). The methods are also typically useful for increasing the permeability in hydrocarbon-bearing formations having brine (e.g., connate brine and/or water blocking). Treatment of a near wellbore region of an oil and/or gas well that has at least one of brine or two phases of hydrocarbons in the near wellbore region using the methods disclosed herein may increase the productivity of the well. Although not wishing to be bound by theory, it is believed that the fluorinated polymer disclosed herein generally adsorbs to at least one of hydrocarbon-bearing formations or proppants under downhole conditions and modify the wetting properties of the rock in the formation to facilitate the removal of hydrocarbons and/or brine. The fluorinated polymer may remain on the rock for the duration of an extraction of hydrocarbons from the formation (e.g., 1 week, 2 weeks, 1 month, or longer). Advantageously, in many embodiments, methods according to the present disclosure are useful for changing the wettability of a variety of materials found in hydrocarbon-bearing formations, including sandstone, limestone, and bauxite proppants. Thus, the treatment methods are more versatile than other treatment methods which are effective with only certain substrates (e.g., sandstone).

In one aspect, the present disclosure provides a method comprising contacting a hydrocarbon-bearing formation with a treatment composition comprising solvent and a fluorinated polymer, wherein the fluorinated polymer comprises:

a first divalent unit represented by formula:

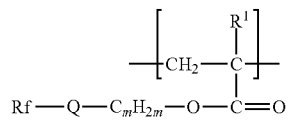

wherein

Rf represents a fluoroalkyl group having from 1 to 8 carbon atoms;

each $R^1$ is independently hydrogen or methyl;

Q is a bond or $-SO_2-N(R)-$, wherein R is alkyl having from 1 to 4 carbon atoms; and m is an integer from 1 to 11, a second divalent unit comprising a poly(alkyleneoxy) group; and a third divalent unit comprising a pendant ionic group, wherein at least one of the following conditions is met:

the solvent comprises not more than ten percent by weight methanol and not more than 25 percent by weight water, based on the total weight of the solvent; or the solvent solubilizes or displaces brine in the hydrocarbon-bearing formation. In some embodiments, both conditions are met. The pendant ionic group may be a cationic, anionic, or amphoteric functional group. The fluorinated polymer may include more than one type of second divalent unit and/or more than one type of third divalent unit. It is generally understood that amine oxides are not ionic groups since they have no formal charges. It is also generally understood that the nitrogen atom in an amino group is understood to be neutral (that is not ionic) and to have a lone pair of electrons, features that distinguish it from a quaternary ammonium group, which has a permanent positive charge regardless of pH. In some embodiments, the fluorinated polymer is free of neutral amino groups.

In another aspect, the present disclosure provides a hydrocarbon-bearing formation comprising a surface, wherein at least a portion of the surface is contacted according to the method disclosed herein.

In some embodiments of the foregoing aspects, the hydrocarbon-bearing formation is penetrated by a wellbore, wherein a region near the wellbore is treated with the treatment composition. In some of these embodiments, the method further comprises obtaining (e.g., pumping or producing) hydrocarbons from the wellbore after treating the hydrocarbon-bearing formation with the treatment composition.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The term "brine" refers to water having at least one dissolved electrolyte salt therein (e.g., having any nonzero concentration, and which may be less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or greater than 200,000 ppm).

The term "hydrocarbon-bearing formation" includes both hydrocarbon-bearing formations in the field (i.e., subterranean hydrocarbon-bearing formations) and portions of such hydrocarbon-bearing formations (e.g., core samples).

The term "contacting" includes placing a treatment composition within a hydrocarbon-bearing formation using any suitable manner known in the art (e.g., pumping, injecting, pouring, releasing, displacing, spotting, or circulating the treatment composition into a well, wellbore, or hydrocarbon-bearing formation).

The term "solvent" refers to a homogeneous liquid material (inclusive of any water with which it may be combined) that is capable of at least partially dissolving the fluorinated polymer disclosed herein at 25° C.

"Alkyl group" and the prefix "alk-" are inclusive of both straight chain and branched chain groups and of cyclic groups. Unless otherwise specified, alkyl groups herein have up to 20 carbon atoms. Cyclic groups can be monocyclic or polycyclic and, in some embodiments, have from 3 to 10 ring carbon atoms.

The phrase "interrupted by at least one functional group", for example, with regard to an alkyl (which may or may not be fluorinated), alkylene, or arylalkylene refers to having part of the alkyl, alkylene, or arylalkylene on both sides of the functional group.

The term "polymer" refers to a molecule having a structure which essentially includes the multiple repetition of units derived, actually or conceptually, from molecules of low relative molecular mass. The term "polymer" encompasses oligomers.

The term "fluoroalkyl group" includes linear, branched, and/or cyclic alkyl groups in which all C—H bonds are replaced by C—F bonds as well as groups in which hydrogen or chlorine atoms are present instead of fluorine atoms. In some embodiments, up to one atom of either hydrogen or chlorine is present for every two carbon atoms. In some embodiments of fluoroalkyl groups, when at least one hydrogen or chlorine is present, the fluoroalkyl group includes at least one trifluoromethyl group.

The term "productivity" as applied to a well refers to the capacity of a well to produce hydrocarbons (i.e., the ratio of the hydrocarbon flow rate to the pressure drop, where the pressure drop is the difference between the average reservoir pressure and the flowing bottom hole well pressure (i.e., flow per unit of driving force)).

The region near the wellbore (i.e., near wellbore region) includes a region within about 25 feet (in some embodiments, 20, 15, or 10 feet) of the wellbore.

All numerical ranges are inclusive of their endpoints and nonintegral values between the endpoints unless otherwise stated.

BRIEF DESCRIPTION OF THE DRAWINGS

For a more complete understanding of the features and advantages of the present disclosure, reference is now made to the detailed description along with the accompanying figures and in which.

DETAILED DESCRIPTION

Figure 1:
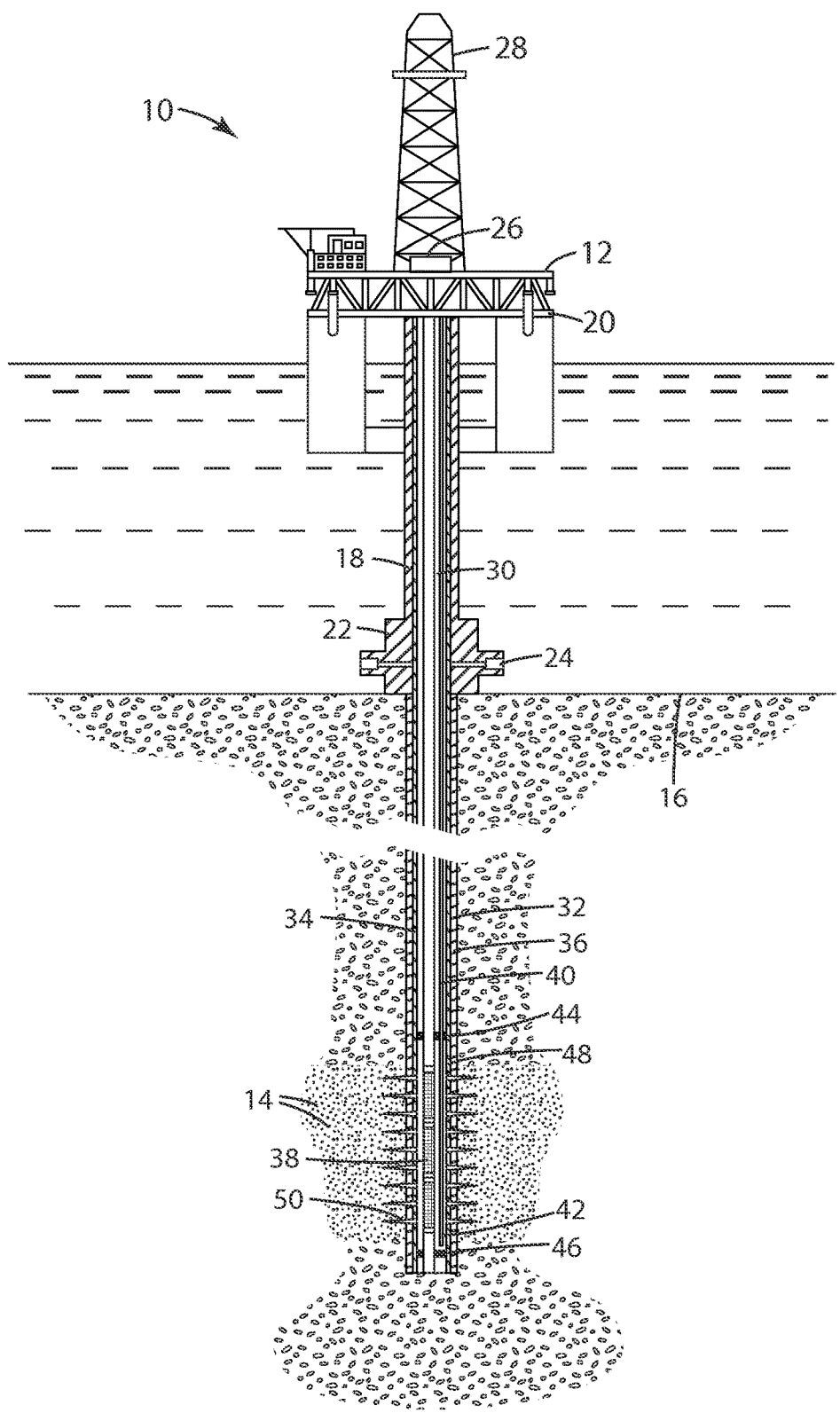
FIG. 1 is a schematic illustration of an exemplary embodiment of an offshore oil platform operating an apparatus for progressively treating a near wellbore region according to some embodiments of the present disclosure.

In some embodiments of compositions useful in practicing the present disclosure, the fluorinated polymer comprises (e.g., at least 2, 3, 4, 5, 6, 7, 8, 9, 10, 15, or at least 20 up to 30, 35, 40, 45, 50, 100, or up to 200) first divalent units independently represented by formula:

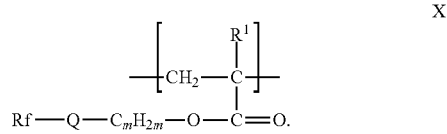

For divalent units having this formula, Q is a bond or —SO$_2$N(R)—, wherein R is alkyl having 1 to 4 carbon atoms (e.g., methyl, ethyl, n-propyl, isopropyl, n-butyl, or isobutyl). In some embodiments, Q is a bond. In some embodiments, Q is —SO$_2$N(R)—. In some of these embodiments, R is methyl or ethyl. m is an integer from 1 to 11 (i.e., 1, 2, 3, 4, 5, 6, 7, 8, 9, 10, or 11). In some of these embodiments, m is 1; in other of these embodiments, m is 2. In some embodiments wherein Q is —SO$_2$N(R)—, m is an integer from 2 to 11, 2 to 6, or 2 to 4. In some embodiments wherein Q is a bond, m is an integer from 1 to 6, 1 to 4, or 1 to 2. In embodiments wherein Q is a bond, it should be understood that the first divalent units may also be represented by formula:

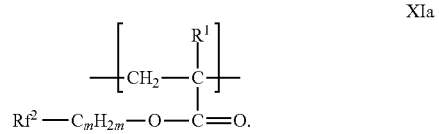

In some embodiments, fluorinated polymers according to the present disclosure comprise (e.g., at least 2, 3, 4, 5, 6, 7, 8, 9, 10, 15, or at least 20 up to 30, 35, 40, 45, 50, 100, or up to 200) first divalent units independently represented by formula:

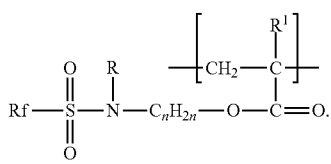

XIb

For divalent units of this formula, n is an integer from 2 to 11 (i.e., 2, 3, 4, 5, 6, 7, 8, 9, 10, or 11). In some embodiments, n is an integer from 2 to 6 or 2 to 4. R is alkyl having 1 to 4 carbon atoms (e.g., methyl, ethyl, n-propyl, isopropyl, n-butyl, or isobutyl). In some embodiments, R is methyl or ethyl.

For any of the embodiments of the first divalent units having Rf groups, each Rf independently represents a fluorinated alkyl group having from 1 to 8 (in some embodiments, 1 to 6, 2 to 6 or 2 to 4) carbon atoms (e.g., trifluoromethyl, perfluoroethyl, 1,1,2,2-tetrafluoroethyl, 2-chlorotetrafluoroethyl, perfluoro-n-propyl, perfluoroisopropyl, perfluoro-n-butyl, 1,1,2,3,3,3-hexafluoropropyl, perfluoroisobutyl, perfluoro-sec-butyl, or perfluoro-tert-butyl, perfluoro-n-pentyl, pefluoroisopentyl, or perfluorohexyl). In some embodiments, Rf is perfluorobutyl (e.g., perfluoro-n-butyl, perfluoroisobutyl, or perfluoro-sec-butyl). In some embodiments, Rf is perfluoropropyl (e.g., perfluoro-n-propyl or perfluoroisopropyl). Rf may contain a mixture of fluoroalkyl groups (e.g., with an average of up to 8, 6, or 4 carbon atoms).

For any of the embodiments of the first divalent units having $Rf^2$ groups, each $Rf^2$ independently represents a fluorinated alkyl group having from 1 to 8 (in some embodiments, 1 to 8, 1 to 6, or 2 to 4) carbon atoms (e.g., trifluoromethyl, perfluoroethyl, 1,1,2,2-tetrafluoroethyl, 2-chlorotetrafluoroethyl, perfluoro-n-propyl, perfluoroisopropyl, perfluoro-n-butyl, 1,1,2,3,3,3-hexafluoropropyl, perfluoroisobutyl, perfluoro-sec-butyl, or perfluoro-tert-butyl, perfluoro-n-pentyl, pefluoroisopentyl, perfluorohexyl, perfluoroheptyl, or perfluorooctyl). In some embodiments, $Rf^2$ is perfluorobutyl (e.g., perfluoro-n-butyl, perfluoroisobutyl, or perfluoro-sec-butyl). In some embodiments, $Rf^2$ is perfluoropropyl (e.g., perfluoro-n-propyl or perfluoroisopropyl). $Rf^2$ may contain a mixture of fluoroalkyl groups (e.g., with an average of up to 8, 6, or 4 carbon atoms).

In some embodiments of fluorinated polymers useful for practicing the present disclosure, the first divalent units have up to 6 fluorinated carbon atoms.

For any of the embodiments of the first divalent units, $R^1$ is hydrogen or methyl. In some embodiments, $R^1$ is hydrogen. In some embodiments, $R^1$ is methyl.

The polyalkyleneoxy group in fluorinated polymers useful for practicing the present disclosure can comprise a plurality (i.e., multiple) of repeating alkyleneoxy groups having from 2 to 4 or 2 to 3 carbon atoms (e.g., $-CH_2CH_2O-$, $-CH(CH_3)CH_2O-$, $-CH_2CH(CH_3)O-$, $-CH_2CH_2CH_2O-$, $-CH(CH_2CH_3)CH_2O-$, $-CH_2CH(CH_2CH_3)O-$, or $-CH_2C(CH_3)_2O-$). In some embodiments, the segment comprises a plurality of ethoxy groups, propoxy groups, or combinations thereof. The polyalkyleneoxy segment may have a number average molecular weight of at least 200, 300, 500, 700, or even at least 1000 grams per mole up to 2000, 4000, 5000, 8000, 10000, 15,000, or even up to 20000 grams per mole. Two or more differing alkyleneoxy groups may be distributed randomly in the series or may be present in alternating blocks. The polyalkyleneoxy group may be pendant from the polymer chain, or it may be a segment incorporated into the polymer backbone.

In some embodiments, the fluorinated polymer comprises at least one (e.g., at least 1, 2, 5, 10, 15, 20, or at least 25) divalent unit represented by formula:

XII

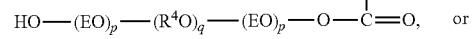

XIII

In formulas XII and XIII, each $R_2$ is independently hydrogen or methyl (in some embodiments, hydrogen and in some embodiments, methyl). Each $R_3$ is independently alkyl having up to 4 carbon atoms (e.g., methyl, ethyl, n-propyl, isopropyl, butyl, isobutyl, or t-butyl) or hydrogen. EO represents $-CH_2CH_2O-$. Each $R^4O$ is independently selected from the group consisting of $-CH(CH_3)CH_2O-$, $-CH_2CH_2CH_2O-$, $-CH_2CH(CH_3)O-$, $-CH_2CH_2CH_2CH_2O-$, $-CH(CH_2CH_3)CH_2O-$, $-CH_2CH(CH_2CH_3)O-$, and $-CH_2C(CH_3)_2O-$. In some embodiments, each $R^4O$ independently represents $-CH(CH_3)CH_2O-$ or $-CH_2CH(CH_3)O-$). Each p is independently a value from 0 to 150 (in some embodiments, from 7 to about 130, or from 14 to about 130); and each q is independently a value from 0 to 150 (in some embodiments, from about 20 to about 100, 1 to 55, or from about 9 to about 25). The sum p+q is at least 5 (in some embodiments, at least 10 or at least 20.) In some embodiments, the ratio p/q has a value from at least 0.5, 0.75, 1 or 1.5 to 2.5, 2.7, 3, 4, 5, or more.

In some embodiments, the second divalent unit is represented by formula:

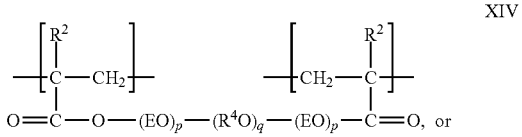

XIV

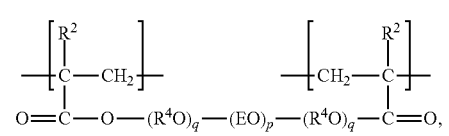

XV wherein p, q, $R^2$, EO, and $R^4O$ are as defined above for formulas XII and XIII in any of their embodiments.

In some embodiments the second divalent unit may be a sulfur-terminated segment (e.g., $-S(O)_{0-2}-C_sH_{2s}-C(O)-O-(EO)_p-C(O)-C_sH_{2s}-S(O)_{0-2}-$, $-S(O)_{0-2}-C_sH_{2s}-C(O)-O-(EO)_p-(R^4O)_q-(EO)_p-C(O)-C_sH_{2s}-S(O)_{0-2}-$, or $-S(O)_{0-2}-C_sH_{2s}-C(O)-O-(PO)_q-(EO)_p-(PO)_q-C(O)-C_sH_{2s}-S(O)_{0-2}-$, wherein p, q, EO, and $R^4O$ are as defined above for formulas XII and XIII in any of their embodiments and s is an integer from 1 to 5, or in some embodiments, 2 to 3).

In some embodiments, fluorinated polymers useful for practicing the present disclosure can be considered anionic polymers. In some of these embodiments, the fluorinated polymers further comprise at least one (e.g., at least 1, 2, 5, 10, 15, 20, or at least 25) anionic third divalent unit represented by formula:

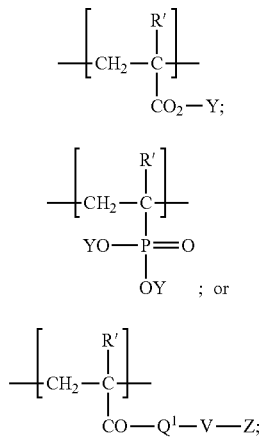

In formulas XVI, XVII, and XVIII, $Q^1$ is —O—, —S—, or —N($R^7$)— (in some embodiments, —O—). Each R' is independently hydrogen or methyl (in some embodiments, hydrogen, and in some embodiments, methyl). Each $R^7$ is independently hydrogen or alkyl having from 1 to 4 carbon atoms (e.g., methyl, ethyl, n-propyl, isopropyl, butyl, isobutyl, or t-butyl). V is alkylene that is optionally interrupted by at least one ether linkage (i.e., —O—) or amine linkage (i.e., —N($R^7$)—). In some embodiments, V is alkylene having from 2 to 4 (in some embodiments, 2) carbon atoms. Each Y is independently selected from the group consisting of hydrogen, a counter cation, and a bond to the hydrocarbon-bearing formation; and each Z is independently selected from the group consisting of —P(O)(OY)$_2$, —O—P(O)(OY)$_2$, —SO$_3$Y, and CO$_2$Y. In some embodiments, Y is hydrogen. In some embodiments, Y is a counter cation. Exemplary Y counter cations include alkali metal (e.g., sodium, potassium, and lithium), ammonium, alkyl ammonium (e.g., tetraalkylammonium), and five to seven membered heterocyclic groups having a positively charged nitrogen atom (e.g, a pyrrolium ion, pyrazolium ion, pyrrolidinium ion, imidazolium ion, triazolium ion, isoxazolium ion, oxazolium ion, thiazolium ion, isothiazolium ion, oxadiazolium ion, oxatriazolium ion, dioxazolium ion, oxathiazolium ion, pyridinium ion, pyridazinium ion, pyrimidinium ion, pyrazinium ion, piperazinium ion, triazinium ion, oxazinium ion, piperidinium ion, oxathiazinium ion, oxadiazinium ion, and morpholinium ion). In some embodiments, for example, of treated hydrocarbon-bearing formations, Y is a bond to the hydrocarbon-bearing formation.

In some embodiments, including any of the aforementioned embodiments, fluorinated polymers useful for practicing the present disclosure can be considered cationic or amphoteric. In some of these embodiments, the fluorinated polymers further comprise at least one (e.g., at least 1, 2, 5, 10, 15, 20, or at least 25) third divalent unit represented by formula:

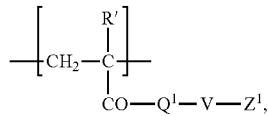

In formula XIX, R', $Q^1$, $R^7$, and V include any of the embodiments described above for formulas XVI, XVII, and XVIII. $Z^1$ is selected from the group consisting of —[N($R^8$)$_3$]$^+$M$^-$, —N$^+$($R^8$)$_2$—(CH$_2$)$_g$—SO$_3$Y$^1$, and —N$^+$($R^8$)$_2$—(CH$_2$)$_g$—CO$_2$Y$^1$, wherein each $R^8$ is independently selected from the group consisting of hydrogen and alkyl having from 1 to 6 carbon atoms (e.g., methyl, ethyl, n-propyl, isopropyl, butyl, isobutyl, t-butyl, n-pentyl, isopentyl, n-hexyl). Each $R^9$ is independently selected from the group consisting of hydrogen and alkyl having from 1 to 6 carbon atoms (e.g., methyl, ethyl, n-propyl, isopropyl, butyl, isobutyl, t-butyl, n-pentyl, isopentyl, n-hexyl), wherein alkyl is optionally substituted by at least one halogen, alkoxy, nitro, or nitrile group, or two $R^9$ groups may join to form a 5 to 7-membered ring optionally containing at least one O, N, or S and optionally substituted by alkyl having 1 to 6 carbon atoms. Each g is independently an integer from 1 to 6 (i.e., 1, 2, 3, 4, 5, or 6). M$^-$ is a counter anion (e.g., acetate, chloride, iodide, ethyl sulfate and methyl sulfate); and $Y^1$ is selected from the group consisting of hydrogen and free anion. In some embodiments, R' and $R^1$ are each independently hydrogen or methyl. In some embodiments of M-, the counter anion is present in the hydrocarbon-bearing formation.

In some embodiments in which the fluorinated polymer includes a third divalent unit represented by formula XIX, $Z^1$ is —[N($R^8$)$_3$]$^+$M$^-$, and the fluorinated polymer is a cationic polymer. In other embodiments where $Z^1$ is —[N($R^8$)$_3$]$^+$M$^-$, if the fluorinated polymer also includes an anionic divalent unit (e.g., represented by formula XVI, XVII, or XVIII) the fluorinated polymer is an amphoteric polymer.

In some embodiments in which the fluorinated polymer includes a third divalent unit represented by formula XIX, $Z^1$ is selected from the group consisting of —N$^+$($R^8$)$_2$—(CH$_2$)$_g$—SO$_3$Y$^1$ and —N$^+$($R^8$)$_2$—(CH$_2$)$_g$—CO$_2$Y$^1$, and the polymer can be considered an amphoteric polymer. In these embodiments, it is generally understood that under neutral pH conditions (e.g., pH 6 to 8), $Y^1$ in $Z^1$ is typically a free anion (i.e., $Z^1$ is —N$^+$($R^8$)$_2$—(CH$_2$)$_g$—SO$_3^-$ or —N$^+$($R^8$)$_2$—(CH$_2$)$_g$—CO$_2^-$). Under strongly acidic conditions (e.g, pH of up to 4), $Y^1$ in $Z^1$ is hydrogen.

Useful polymers can also be prepared, for example, by polymerizing a mixture of components typically in the presence of an initiator. By the term "polymerizing" it is meant forming a polymer or oligomer that includes at least one identifiable structural element due to each of the components. Typically the polymer that is formed has a distribution of molecular weights and compositions. The polymer may have one of many structures (e.g., a random graft copolymer or a block copolymer). The components that are useful for preparing the polymers disclosed herein include a fluorinated free-radically polymerizable monomer independently represented by formula Rf-Q-(C$_m$H$_{2m}$)—O—C(O)—C($R^1$)=CH$_2$ or Rf—SO$_2$—(C$_n$H$_{2n}$)—O—C(O)—C($R^1$)=CH$_2$, wherein Rf, $R^1$, m, and n are as defined above.

Some compounds of Formula Rf-Q-(C$_m$H$_{2m}$)—O—C(O)—C($R^1$)=CH$_2$, are available, for example, from commercial sources (e.g., 3,3,4,4,5,5,6,6,6-nonafluorohexyl acrylate from Daikin Chemical Sales, Osaka, Japan, 3,3,4,4,5,5,6,6,6-nonafluorohexyl 2-methylacrylate from Indofine Chemical Co., Hillsborough, N.J., 1H,1H,2H,2H-perfluorooctylacrylate from ABCR, Karlsruhe, Germany, and 2,2,3,3,4,4,5,5-octafluoropentyl acrylate and methacrylate and 3,3,4,4,5,6,6,6-octafluoro-5-(trifluoromethyl)hexyl methacrylate from Sigma-Aldrich, St. Louis, Mo.). Others can be made by known methods (see, e.g., EP1311637 B1, published Apr. 5, 2006, for the preparation of 2,2,3,3,4,4,4-heptafluorobutyl 2-methylacrylate). Compounds wherein Q is —$SO_2N(R)$— can be made according to methods described in, e.g., U.S. Pat. No. 2,803,615 (Albrecht et al.) and U.S. Pat. No. 6,664,354 (Savu et al.), the disclosures of which, relating to free-radically polymerizable monomers and methods of their preparation, are incorporated herein by reference.

In some embodiments, the components that are useful for preparing the polymers disclosed herein include a poly(alkyleneoxy) acrylate (e.g., monoacrylate, diacrylate, or a mixture thereof). Some alkyleneoxy-containing polymerizable compounds are commercially available (e.g., polyoxyalkylene glycol acrylates and diacrylates (e.g., diethylene glycol diacrylate, tri(ethylene glycol) dimethacrylate, tri(ethylene glycol) divinyl ether, and $CH_2$=CHC(O)O($CH_2CH_2O)_{7-9}$H available, for example, from Nippon Oil & Fats Company, Tokyo, Japan under the trade designation "BLEMMER"). Other useful alkyleneoxy-containing polymerizable compounds can be prepared by known methods, for example, combining one or two equivalents of acryloyl chloride or acrylic acid with a polyethylene glycol or a monoalkyl ether thereof having a molecular weight of about 200 to 10,000 grams per mole (e.g., those available from Dow Chemical Company, Midland, Mich., under the trade designation "CARBOWAX") or a block copolymer of ethylene oxide and propylene oxide having a molecular weight of about 500 to 15000 grams per mole (e.g., those available from BASF Corporation, Ludwigshafen, Germany, under the trade designation "PLURONIC"). The reaction of acrylic acid with a poly(alkylene oxide) is typically carried out in the presence of an acid catalyst and a polymerization inhibitor at an elevated temperature in a suitable solvent; (see, e.g., Example 1 of U.S. Pat. No. 3,787,351 (Olson), the disclosure of which is incorporated herein by reference. In embodiments wherein the fluorinated polymer includes divalent units represented by formula XII or XIII, the alkyleneoxy-containing polymerizable compound can be at least one of HO-(EO)$_p$—($R^4O)_q$-(EO)$_p$—C(O)—C($R^2$)=$CH_2$ or $R^3$O—($R^4O)_q$-(EO)$_p$—($R^4O)_q$—C(O)—C($R^2$)=$CH_2$, wherein $R^2$, $R^3$, $R^4$O, EO, p, and q are as defined above In embodiments wherein the fluorinated polymer includes divalent units represented by formula XIV or XV, the alkyleneoxy-containing polymerizable compound can be $CH_2$=C($R^2$)—C(O)O-(EO)$_p$—($R^4O)_q$-(EO)$_p$—C(O)—C($R^2$)=$CH_2$ or $CH_2$=C($R^2$)—C(O)O—($R^4O)_q$-(EO)$_p$—($R^4O)_q$—C(O)—C($R^2$)=$CH_2$, wherein $R^2$, $R^3$, $R^4$O, EO, p, and q are as defined above.

Sulfur-terminated polyalkyleneoxy segments can be incorporated into the fluorinated polymers by copolymerization of a difunctional mercaptan, which can react with fluorinated acrylates (e.g., Rf-Q-($C_mH_{2m}$)—O—C(O)—C($R^1$)=$CH_2$ or Rf—$SO_2$—($C_nH_{2n}$)—O—C(O)—C($R^1$)=$CH_2$) under free-radical polymerization conditions to provide block copolymers. Examples of difunctional mercaptans include HS—$C_sH_{2s}$—C(O)—O-(EO)$_p$—C(O)—$C_sH_{2s}$—SH, HS—$C_sH_{2s}$—C(O)—O-(EO)$_p$—($R^4O)_q$-(EO)$_p$—C(O)—$C_sH_{2s}$—SH, or HS—$C_sH_{2s}$—C(O)—O—(PO)$_q$-(EO)$_p$-(PO)$_q$—C(O)—$C_sH_{2s}$—SH, wherein p, q, EO, and $R^4$O are as defined above for formulas XII and XIII in any of their embodiments and s is an integer from 1 to 5, or in some embodiments, 2 to 3. The resulting polymer or oligomer can then optionally be oxidized using conventional techniques. Difunctional mercaptans can be prepared, for example, by reaction of a diol-functional polyethylene glycol or a block copolymer of ethylene oxide and propylene oxide with, for example, mercaptoacetic acid or mercaptopropionic acid. In other embodiments, polyalkyleneoxy-containing diacrylates can be treated with $H_2S$ or other sulfhydryl-containing compounds according to the methods of U.S. Pat. No. 3,278,352 (Erickson), incorporated herein by reference, to provide mercaptan-terminated polyalkyleneoxy compounds.

Divalent units of Formulas XVI, XVII, and XVIII can be incorporated into the fluorinated polymers disclosed herein by copolymerization of a compound of formula $Rf^2$-Q-($C_mH_{2m}$)—O—C(O)—C($R^1$)=$CH_2$ or Rf—$SO_2$—($C_nH_{2n}$)—O—C(O)—C($R^1$)=$CH_2$ with a compound of formula YOOC—C(R')=$CH_2$, $(YO)_2(O)P$—C(R')=$CH_2$, and Z—V-$Q^1$C(O)—C(R')=$CH_2$, respectively. Useful compounds of these formulas include acrylic acid, methacrylic acid, β-carboxyethyl acrylate, β-carboxyethyl methacryate, vinyl phosphonic acid, ethylene glycol methacrylate phosphate, and 2-acrylamido-2-methyl-1-propane sulfonic acid (AMPS).

Divalent units of Formula XIX can be incorporated into the fluorinated polymers disclosed herein by copolymerization of a compound of formula Rf-Q-($C_mH_{2m}$)—O—C(O)—C($R^1$)=$CH_2$ or Rf—$SO_2$—($C_nH_{2n}$)—O—C(O)—C($R^1$)=$CH_2$ with a compound of formula $Z^1$—V-$Q^1$C(O)—C(R')=$CH_2$. Useful compounds for preparing compound of formula $Z^1$—V-$Q^1$C(O)—C(R)=$CH_2$ include aminoalkyl (meth)acrylates such as N,N-diethylaminoethylmethacrylate, N,N'-dimethylaminoethylmethacrylate and N-t-butylaminoethylmethacrylate, which are commercially available, for example, from Sigma-Aldrich and can be quaternized using conventional techniques, for example, by reaction with an alkyl halide (e.g., bromobutane, bromoheptane, bromodecane, bromododecane, or bromohexadecane) or a dialkylsulphate (e g dimethyl sulfate or diethyl sulfate) in a suitable solvent and optionally in the presence of a free-radical inhibitor to provide a compound wherein $Z^1$ is —[N($R^8$)$_3$]$^+$$M^-$. Useful compounds having formula $Z^1$—V-$Q^1$C(O)—C(R)=$CH_2$ include N,N-dimethylaminoethyl acrylate methyl chloride quaternary and N,N-dimethylaminoethyl methacrylate methyl chloride quaternary available from Ciba Specialty Chemicals, Basel, Switzerland, under the trade designations "CIBA AGEFLEX FA1Q80MC" and "CIBA AGEFLEX FM1Q75MC", respectively.

Divalent units of Formula XIX can be incorporated into the fluorinated polymers disclosed herein by copolymerization of a compound of formula Rf-Q-($C_mH_{2m}$)—O—C(O)—C($R^1$)=$CH_2$ or Rf—$SO_2$—($C_nH_{2n}$)—O—C(O)—C($R^1$)=$CH_2$ with a compound of formula $N(R^8)_2$—V-$Q^1$C(O)—C(R')=$CH_2$. Useful compounds of formula $N(R^8)_2$—V-$Q^1$C(O)—C(R)=$CH_2$ include aminoalkyl(meth)acrylates such as N,N-diethylaminoethylmethacrylate, N,N'-dimethylaminoethylmethacrylate and N-t-butylaminoethylmethacrylate, which are commercially available, for example, from Sigma-Aldrich and can be treated with 1,3-propanesultone, acrylic acid, chloroacetic acid, or 2-bromoethanesulfonic acid using the methods described in U.S. Pat. No. 5,144,069 (Stern et al.) and U.S. Pat. No. 5,468,353 (Anich et al.), the disclosure of which methods are incorporated herein by reference.

In some embodiments, fluorinated polymers useful for practicing the present disclosure further comprise at least one (e.g., at least 1, 2, 5, 10, 15, 20, 25, or at least 50) divalent unit represented by Formula XX:

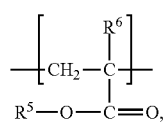

wherein each $R^6$ is independently hydrogen or methyl (in some embodiments, hydrogen, in some embodiments, methyl), and wherein each $R^5$ is independently alkyl having from 1 to 30 (in some embodiments, 1 to 25, 1 to 20, 1 to 10, 4 to 25, 8 to 25, or 12 to 25) carbon atoms. In some embodiments, each $R^5$ is independently alkyl having up to 8 carbon atoms (e.g., methyl, ethyl, n-propyl, isopropyl, n-butyl, iso-butyl, n-pentyl, neopentyl, hexyl, heptyl, or octyl). In some embodiments, $R^5$ is hexadecyl or octadecyl. In some of these embodiments, the fluorinated polymer is by including at least one compound represented by formula $R^5$—O—C(O)—C($R^6$)=$CH_2$ in the components to be polymerized. Compounds of formula $R^5$—O—C(O)—C($R^6$)=$CH_2$, (e.g., methyl methacrylate, butyl acrylate, hexadecyl methacrylate, octadecyl methacrylate, stearyl acrylate, behenyl methacrylate) are available, for example, from several chemical suppliers (e.g., Sigma-Aldrich Company, St. Louis, Mo.; VWR International, West Chester, Pa.; Monomer-Polymer & Dajac Labs, Festerville, Pa.; Avocado Organics, Ward Hill, Mass.; and Ciba Specialty Chemicals, Basel, Switzerland) or may be synthesized by conventional methods. Some compounds of formula $R^5$—O—C(O)—C($R^6$)=$CH_2$ are available as single isomers (e.g., straight-chain isomer) of single compounds. Other compounds of formula $R^5$—O—C(O)—C($R^6$)=$CH_2$ are available, for example, as mixtures of isomers (e.g., straight-chain and branched isomers), mixtures of compounds (e.g., hexadecyl acrylate and octadecylacrylate), and combinations thereof.

Fluorinated polymers useful for practicing the present disclosure may also be preparable by adding additional monomers to the polymerization reaction. For example, a compound formula HO—V—O—C(O)—C(R)=$CH_2$, wherein R' and V are as defined above may be used. Examples of these monomers include hydroxyethyl methacrylate. Other examples include vinylidene chloride, vinyl chloride, silicone acrylates available, for example, from Shin-Etsu Silicones of America, Inc., Akron, Ohio, under the trade designation "X22-2426", and urethane acrylates available, for example, from Sartomer Company, Exton, Pa. under the trade designation "CN966J75. These units may be incorporated into the compound by selecting additional components for the free-radical reaction such as allyl esters (e.g., allyl acetate and allyl heptanoate); vinyl ethers or allyl ethers (e.g., cetyl vinyl ether, dodecylvinyl ether, 2-chloroethylvinyl ether, or ethylvinyl ether); alpha-beta unsaturated nitriles (e.g., acrylonitrile, methacrylonitrile, 2-chloroacrylonitrile, 2-cyanoethyl acrylate, or alkyl cyanoacrylates); alpha-beta-unsaturated carboxylic acid derivatives (e.g., allyl alcohol, allyl glycolate, acrylamide, methacrylamide, n-diisopropyl acrylamide, or diacetoneacrylamide), styrene and its derivatives (e.g., vinyltoluene, alpha-methylstyrene, or alpha-cyanomethyl styrene); olefinic hydrocarbons which may contain at least one halogen (e.g., ethylene, propylene, isobutene, 3-chloro-1-isobutene, butadiene, isoprene, chloro and dichlorobutadiene, 2,5-dimethyl-1,5-hexadiene, and vinyl and vinylidene chloride); and hydroxyalkyl-substituted polymerizable compounds (e.g., 2-hydroxyethyl methacrylate).

In some embodiments, fluorinated polymers useful for practicing the present disclosure the fluorinated polymer are free of divalent units comprising a pendant silane group and free of silane terminal groups.

In some embodiments, fluorinated polymers useful for practicing the present disclosure are free of divalent units comprising a pendant amino group. In some embodiments, fluorinated polymers useful for practicing the present disclosure are free of amino groups. It will be understood by a person having ordinary skill in the art that an amine is a neutral —$NR_2$ group. The R groups may be the same or different and may include hydrogen, alkyl or alkylene groups, aryl or arylene groups, etc. The nitrogen atom is understood to be neutral and to have a lone pair of electrons, features that distinguish them from quaternary ammonium compounds, which have a permanent positive charge regardless of pH.

The polymerization reaction can be carried out in the presence of an added free-radical initiator. Free radical initiators such as those widely known and used in the art may be used to initiate polymerization of the components. Exemplary free-radical initiators are described in U.S. Pat. No. 6,664,354 (Savu et al.), the disclosure of which, relating to free-radical initiators, is incorporated herein by reference. In some embodiments, the polymer or oligomer that is formed is a random graft copolymer. In some embodiments, the polymer or oligomer that is formed is a block copolymer.

In some embodiments, the polymerization reaction is carried out in solvent. The components may be present in the reaction medium at any suitable concentration, (e.g., from about 5 percent to about 80 percent by weight based on the total weight of the reaction mixture). Illustrative examples of suitable solvents include aliphatic and alicyclic hydrocarbons (e.g., hexane, heptane, cyclohexane), aromatic solvents (e.g., benzene, toluene, xylene), ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), halogenated solvents (e.g., methylchloroform, 1,1,2-trichloro-1,2,2-trifluoroethane, trichloroethylene, trifluorotoluene, and hydrofluoroethers available, for example, from 3M Company, St. Paul, Minn. under the trade designations "HFE-7100" and "HFE-7200"), and mixtures thereof.

Polymerization can be carried out at any temperature suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or from about 50° C. to about 80° C.).

Free-radical polymerizations may be carried out in the presence of chain transfer agents. Typical chain transfer agents that may be used in the preparation compositions according to the present invention include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); poly(ethylene glycol)-substituted mercaptans; carboxy-substituted mercaptans (e.g., mercaptopropionic acid or mercaptoacetic acid); amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan).

Adjusting, for example, the concentration and activity of the initiator, the concentration of each of the reactive monomers, the temperature, the concentration of the chain transfer agent, and the solvent using techniques known in the art can control the molecular weight of a polyacrylate polymer or copolymer.

In some embodiments, fluorinated polymers disclosed herein have weight average molecular weights in a range from 1000 grams per mole to 100,000 grams per mole. In some embodiments, the weight average molecular weight is at least 2000, 3000, 4000, 5000, 6000, 7000, 8000, 9000, or 10000 grams per mole up to 30,000, 40,000, 50,000, 60,000, 70,000, 80,000, or up to 90,000 grams per mole. Fluorinated polymers disclosed herein typically have a distribution of molecular weights and compositions. Weight average molecular weights can be measured, for example, by gel permeation chromatography (i.e., size exclusion chromatography) using techniques known to one of skill in the art.

Typically, in treatment compositions useful for practicing the methods described herein, the fluorinated polymer is present in the treatment composition at at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight, based on the total weight of the treatment composition. For example, the amount of the fluorinated polymer in the treatment compositions may be in a range of from 0.01 to 10, 0.1 to 10, 0.1 to 5, 1 to 10, 0.5 to 2, or in a range from 1 to 5 percent by weight, based on the total weight of the treatment composition. Lower and higher amounts of the fluorinated polymer in the treatment compositions may also be used, and may be desirable for some applications.

Treatment compositions useful for practicing the methods disclosed herein comprise at least one of solvent. Examples of useful solvents for any of these methods include organic solvents, water, easily gasified fluids (e.g., ammonia, low molecular weight hydrocarbons, and supercritical or liquid carbon dioxide), and combinations thereof. In some embodiments, the solvent comprises not more than 25 (in some embodiments, not more than 20, 15, 10, 5, or 1) percent by weight water, based on the total weight of the solvent. In some embodiments, the compositions are essentially free of water (i.e., contains less than 0.1 percent by weight of water based on the total weight of the composition). In some embodiments, the solvent is a water-miscible solvent (i.e., the solvent is soluble in water in all proportions). Examples of organic solvents include polar and/or water-miscible solvents, for example, monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, dipropylene glycol, or poly(propylene glycol)), triols (e.g., glycerol, trimethylolpropane), or pentaerythritol; ethers such as diethyl ether, methyl t-butyl ether, tetrahydrofuran, p-dioxane, or polyol ethers (e.g., glycol ethers (e.g., ethylene glycol monobutyl ether, diethylene glycol monomethyl ether, dipropylene glycol monomethyl ether, propylene glycol monomethyl ether, 2-butoxyethanol, or those glycol ethers available under the trade designation "DOWANOL" from Dow Chemical Co., Midland, Mich.)); ketones (e.g., acetone or 2-butanone); and combinations thereof.

In some embodiments of the methods disclosed herein, the solvent comprises at least one of a polyol or polyol ether independently having from 2 to 25 (in some embodiments, 2 to 15, 2 to 10, 2 to 9, or 2 to 8) carbon atoms. In some embodiments, the solvent comprises a polyol. The term "polyol" refers to an organic molecule consisting of C, H, and O atoms connected one to another by C—H, C—C, C—O, O—H single bonds, and having at least two C—O—H groups. In some embodiments, useful polyols have 2 to 25, 2 to 20, 2 to 15, 2 to 10, 2 to 8, or 2 to 6 carbon atoms. In some embodiments, the solvent comprises a polyol ether. The term "polyol ether" refers to an organic molecule consisting of C, H, and O atoms connected one to another by C—H, C—C, C—O, O—H single bonds, and which is at least theoretically derivable by at least partial etherification of a polyol. In some embodiments, the polyol ether has at least one C—O—H group and at least one C—O—C linkage. Useful polyol ethers may have from 3 to 25 carbon atoms, 3 to 20, 3 to 15, 3 to 10, 3 to 8, or from 5 to 8 carbon atoms. In some embodiments, the polyol is at least one of ethylene glycol, propylene glycol, poly(propylene glycol), 1,3-propanediol, or 1,8-octanediol, and the polyol ether is at least one of 2-butoxyethanol, diethylene glycol monomethyl ether, ethylene glycol monobutyl ether, dipropylene glycol monomethyl ether, or 1-methoxy-2-propanol. In some embodiments, the polyol and/or polyol ether has a normal boiling point of less than 450° F. (232° C.), which may be useful, for example, to facilitate removal of the polyol and/or polyol ether from a well after treatment. In some embodiments, the solvent comprises at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether.

In some embodiments of the methods disclosed herein, the solvent comprises at least one of water, a monohydroxy alcohol, an ether, or a ketone, wherein the monohydroxy alcohol, the ether, and the ketone each independently have up to 4 carbon atoms. Exemplary monohydroxy alcohols having from 1 to 4 carbon atoms include methanol, ethanol, n-propanol, isopropanol, 1-butanol, 2-butanol, isobutanol, and t-butanol. Exemplary ethers having from 2 to 4 carbon atoms include diethyl ether, ethylene glycol methyl ether, tetrahydrofuran, p-dioxane, and ethylene glycol dimethyl ether. Exemplary ketones having from 3 to 4 carbon atoms include acetone, 1-methoxy-2-propanone, and 2-butanone. In some embodiments, useful solvents for practicing the methods disclosed herein comprise at least one of methanol, ethanol, isopropanol, tetrahydrofuran, or acetone.

In some embodiments of the methods disclosed herein, the treatment compositions comprise at least two organic solvents. In some embodiments, the treatment compositions comprise at least one of a polyol or polyol ether independently having from 2 to 25 (in some embodiments, 2 to 15, 2 to 10, 2 to 9, or even 2 to 8) carbon atoms and at least one of water, a monohydroxy alcohol, an ether, or a ketone, wherein the monohydroxy alcohol, the ether, and the ketone each independently have up to 4 carbon atoms. In these embodiments, in the event that a component of the solvent is a member of two functional classes, it may be used as either class but not both. For example, ethylene glycol methyl ether may be a polyol ether or a monohydroxy alcohol, but not both simultaneously. In these embodiments, each solvent component may be present as a single component or a mixture of components. In some embodiments, compositions useful for practicing the methods disclosed herein comprise at least one of a polyol or polyol ether independently having from 2 to 25 (in some embodiments, 2 to 15, 2 to 10, 2 to 9, or even 2 to 8) carbon atoms and at least one monohydroxy alcohol having up to 4 carbon atoms. In some embodiments, the solvent consists essentially of (i.e., does not contain any components that materially affect water solubilizing or displacement properties of the composition under downhole conditions) at least one of a polyol having from 2 to 25 (in some embodiments, 2 to 20, 2 to 15, 2 to 10, 2 to 9, 2 to 8, or even 2 to 6) carbon atoms or polyol ether having from 3 to 25 (in some embodiments, 3 to 20, 3 to 15, 3 to 10, 3 to 9, 3 to 8, or even from 5 to 8) carbon atoms, and at least one monohydroxy alcohol having from 1 to 4 carbon atoms, ether having from 2 to 4 carbon atoms, or ketone having from 3 to 4 carbon atoms. Typically, the solvents described herein are capable of solubilizing more brine in the presence of fluorinated polymer than methanol alone. Also, typically, the solvents described herein are capable of solubilizing more brine in the presence of fluorinated polymer than a solvent including up to 25, 20, 15, 10, 5, or 1 percent water, based on the total weight of the solvent. See, for example, Comparative Example A in U.S. Pat. No. 7,585,817 (Pope et al.).

In some embodiments of methods according to the present disclosure, useful solvents at least one of at least partially solubilize or at least partially displace brine in the hydrocarbon-bearing formation. By the term "solubilizes", it is meant that the solvent dissolves the water and the salts in the brine. "At least partially solubilize" includes dissolving all or nearly all (e.g., at least 95% including up to 100%) of the water and the salts in the brine. In some embodiments, useful solvents at least partially solubilize or at least partially displace liquid hydrocarbons in the hydrocarbon-bearing formation.

For any of the embodiments of the methods disclosed herein, wherein the treatment compositions comprise at least one of a polyol or polyol ether independently having from 2 to 25 (in some embodiments, 2 to 15, 2 to 10, 2 to 9, or 2 to 8) carbon atoms, the polyol or polyol ether is present in the composition at at least 50, 55, 60, or 65 percent by weight and up to 75, 80, 85, or 90 percent by weight, based on the total weight of the composition. Exemplary solvent combinations that contain at least one of a polyol or polyol ether include 1,3-propanediol (80%)/isopropanol (IPA) (20%), propylene glycol (70%)/IPA (30%), propylene glycol (90%)/IPA (10%), propylene glycol (80%)/IPA (20%), ethylene glycol (50%)/ethanol (50%), ethylene glycol (70%)/ethanol (30%), propylene glycol monobutyl ether (PGBE) (50%)/ethanol (50%), PGBE (70%)/ethanol (30%), dipropylene glycol monomethyl ether (DPGME) (50%)/ethanol (50%), DPGME (70%)/ethanol (30%), diethylene glycol monomethyl ether (DEGME) (70%)/ethanol (30%), triethylene glycol monomethyl ether (TEGME) (50%)/ethanol (50%), TEGME (70%)/ethanol (30%), 1,8-octanediol (50%)/ethanol (50%), propylene glycol (70%)/tetrahydrofuran (THF) (30%), propylene glycol (70%)/acetone (30%), propylene glycol (70%), methanol (30%), propylene glycol (60%)/IPA (40%), 2-butoxyethanol (80%)/ethanol (20%), 2-butoxyethanol (70%)/ethanol (30%), 2-butoxyethanol (60%)/ethanol (40%), propylene glycol (70%)/ethanol (30%), ethylene glycol (70%)/IPA (30%), and glycerol (70%)/IPA (30%), wherein the exemplary percentages are by weight are based on the total weight of solvent. In some embodiments of the methods disclosed herein, the solvent comprises up to 95, 90, 80, 70, 60, 50, 40, 30, 20, or 10 percent by weight of a monohydroxy alcohol having up to 4 carbon atoms, based on the total weight of the composition.

In some embodiments of treatment compositions disclosed herein, the solvent comprises a ketone, ether, or ester having from 4 to 10 (e.g., 5 to 10, 6 to 10, 6 to 8, or 6) carbon atoms or a hydrofluoroether or hydrofluorocarbon. In some of these embodiments, the solvent comprises two different ketones, each having 4 to 10 carbon atoms (e.g., any combination of 2-butanone, 4-methyl-2-pentanone, 3-methyl-2-pentanone, 2-methyl-3-pentanone, and 3,3-dimethyl-2-butanone). In some embodiments, the solvent further comprises at least one of water or a monohydroxy alcohol having up to 4 carbon atoms (e.g., methanol, ethanol, n-propanol, isopropanol, 1-butanol, 2-butanol, isobutanol, and t-butanol). Useful ethers having 4 to 10 carbon atoms include diethyl ether, diisopropyl ether, tetrahydrofuran, p-dioxane, and tert-butyl methyl ether. Useful esters having 4 to 10 carbon atoms include ethyl acetate, propyl acetate, and butyl acetate. Useful hydrofluoroethers may be represented by the general formula $Rf^3$—$[O$—$R_h]_a$, wherein a is an integer from 1 to 3; $Rf^3$ is a perfluoroalkyl or di- or trivalent perfluoroalkylene, each of which may be interrupted with at least one —O—; and $R_h$ is an alkyl group optionally interrupted with at least one —O—. Numerous hydrofluoroethers of this type are disclosed in U.S. Pat. No. 6,380,149 (Flynn et al.), the disclosure of which is incorporated herein by reference. In some embodiments, the hydrofluoroether is methyl perfluorobutyl ether or ethyl perfluorobutyl ether. Useful hydrofluoroethers also include hydrofluoroethers available, for example, from 3M Company, St. Paul, Minn., under the trade designations "HFE-7100" and "HFE-7200".

The amount of solvent typically varies inversely with the amount of other components in treatment compositions useful for practicing the present disclosure. For example, based on the total weight of the composition the solvent may be present in the composition in an amount of from at least 10, 20, 30, 40, or 50 percent by weight or more up to 60, 70, 80, 90, 95, 98, or 99 percent by weight, or more.

The ingredients for treatment compositions described herein including fluorinated polymers and solvent can be combined using techniques known in the art for combining these types of materials, including using conventional magnetic stir bars or mechanical mixer (e.g., in-line static mixer and recirculating pump).

Although not wishing to be bound by theory, it is believed that treatment methods according to the present disclosure will provide more desirable results when the treatment composition is homogenous at the temperature(s) encountered in the hydrocarbon-bearing formation. Whether the treatment composition is homogeneous at the temperature can depend on many variables (e.g., concentration of the fluorinated polymer, solvent composition, brine concentration and composition, hydrocarbon concentration and composition, and the presence of other components (e.g., surfactants)). It is believed that once the treatment composition contacts a hydrocarbon-bearing formation (e.g., downhole), the environment will cause the fluorinated polymer to become less soluble in the composition and adsorb onto at least one of the formation or at least a portion of a plurality of proppants located in a fracture in the formation. Once adsorbed onto the formation or at least a portion of a plurality of proppants, the fluorinated polymer can modify the wetting properties of the formation and cause an increase in at least one of the gas or oil permeabilities in the formation. It is believed that low-foaming fluorinated polymers and compositions are more effective for increasing the gas permeability of hydrocarbon-bearing formations.

In some embodiments of methods and treated hydrocarbon-bearing formations disclosed herein, the hydrocarbon-bearing formation has brine. The brine present in the formation may be from a variety of sources including at least one of connate water, flowing water, mobile water, immobile water, residual water from a fracturing operation or from other downhole fluids, or crossflow water (e.g., water from adjacent perforated formations or adjacent layers in the formations). The brine may cause water blocking in the hydrocarbon-bearing formation before treatment. In some embodiments of the treatment compositions, the solvent at least partially solubilizes or at least partially displaces brine in the hydrocarbon-bearing formation. In some embodiments, the brine has at least 2, 3, 4, 5, 6, 7, 8, 9, or at least 10 weight percent dissolved salts (e.g., sodium chloride, calcium chloride, strontium chloride, magnesium chloride, potassium chloride, ferric chloride, ferrous chloride, and hydrates thereof), based on the total weight of the brine. Although not wanting to be bound by theory, it is believed that the effectiveness of the methods disclosed herein for improving hydrocarbon productivity of a particular oil and/or gas well having brine accumulated in the near wellbore region will typically be determined by the ability of the treatment composition to dissolve or displace the quantity of brine present in the near wellbore region of the well without causing precipitation of the fluorinated polymer or salts. Hence, at a given temperature greater amounts of treatment compositions having lower brine solubility (i.e., treatment compositions that can dissolve a relatively lower amount of brine) will typically be needed than in the case of treatment compositions having higher brine solubility and containing the same fluorinated polymer at the same concentration.

In some embodiments, a mixture of an amount of the brine composition and the treatment composition, at the temperature of the hydrocarbon-bearing formation, is transparent and free of precipitated solids. As used herein, the term transparent refers to allowing clear view of objects beyond. In some embodiments, transparent refers to liquids that are not hazy or cloudy. The term "substantially free of precipitated solid" refers to an amount of precipitated solid that does not interfere with the ability of the fluorinated polymer to increase the gas or liquid permeability of the hydrocarbon-bearing formation. In some embodiments, "substantially free of precipitated solid" means that no precipitated solid is visually observed. In some embodiments, "substantially free of precipitated solid" is an amount of solid that is less than 5% by weight higher than the solubility product at a given temperature and pressure.

In some embodiments, the transparent mixture of the brine composition and the treatment composition does not separate into layers, and in other embodiments, the transparent mixture of the brine composition and the treatment composition separates into at least two separate transparent liquid layers. Phase behavior of a mixture of the brine composition and the treatment composition can be evaluated prior to treating the hydrocarbon-bearing formation by obtaining a sample of the brine from the hydrocarbon-bearing formation and/or analyzing the composition of the brine from the hydrocarbon-bearing formation and preparing an equivalent brine having the same or similar composition to the composition of the brine in the formation. The brine composition and the treatment composition can be combined (e.g., in a container) at the temperature and then mixed together (e.g., by shaking or stirring). The mixture is then maintained at the temperature for a certain time period (e.g., 15 minutes), removed from the heat, and immediately visually evaluated to see if phase separation, cloudiness, or precipitation occurs. The amount of the brine composition in the mixture may be in a range from 5 to 95 percent by weight (e.g., at least 10, 20, 30, percent by weight and up to 35, 40, 45, 50, 55, 60, or 70 percent by weight) based on the total weight of the mixture.

Whether the mixture of the brine composition and the treatment composition is transparent, substantially free of precipitated solid, and separates into layers at the temperature of the hydrocarbon-bearing formation can depend on many variables (e.g., concentration of the fluorinated polymer, solvent composition, brine concentration and composition, hydrocarbon concentration and composition, and the presence of other components (e.g., surfactants or scale inhibitors)). Typically, for treatment compositions comprising at least one of a polyol or polyol ether described above and a monohydroxy alcohol having up to 4 carbon atoms, mixtures of the brine composition and the treatment composition do not separate into two or more layers. In some of these embodiments, the salinity of the brine is less than 150,000 ppm (e.g., less than 140,000, 130,000, 120,000, or 110,000 ppm) total dissolved salts. Typically, for treatment compositions described above comprising at least one (e.g., one or two) ketone having from 4 to 10 carbon atoms or a hydrofluoroether, mixtures of the brine composition and the treatment composition separate into two or more layers. In some of these embodiments, the salinity of the brine is greater than 100,000 ppm (e.g., greater than 110,000, 125,000, 130,000, or 150,000 ppm) total dissolved salt. Although not wishing to be bound by theory, it is believed that when two or more layers form in such mixtures, the fluorinated polymer preferentially partitions into a layer rich in organic solvent that has a lower concentration of dissolved salts. Typically, treatment compositions comprising at least one of a polyol or polyol ether described above and treatment compositions comprising at least one ketone having from 4 to 10 carbon atoms or a hydrofluoroether are capable of solubilizing more brine (i.e., no salt precipitation occurs) in the presence of a fluorinated polymer than methanol, ethanol, propanol, butanol, or acetone alone.

The phase behavior of the composition and the brine can be evaluated over an extended period of time (e.g., 1 hour, 12 hours, 24 hours, or longer) to determine if any phase separation, precipitation, or cloudiness is observed. By adjusting the relative amounts of brine (e.g., equivalent brine) and the treatment composition, it is possible to determine the maximum brine uptake capacity (above which precipitation occurs) of the treatment composition at a given temperature. Varying the temperature at which the above procedure is carried out typically results in a more complete understanding of the suitability of treatment compositions for a given well.

In some embodiments of the methods disclosed herein, the hydrocarbon-bearing formation has both liquid hydrocarbons and gas, and the hydrocarbon-bearing formation has at least a gas permeability that is increased after the hydrocarbon-bearing formation is treated with the treatment composition. In some embodiments, the gas permeability after treating the hydrocarbon-bearing formation with the treatment composition is increased by at least 5 percent (in some embodiments, by at least 10, 15, 20, 30, 40, 50, 60, 70, 80, 90, or 100 percent or more) relative to the gas permeability of the formation before treating the formation. In some embodiments, the gas permeability is a gas relative permeability. In some embodiments, the liquid (e.g., oil or condensate) permeability in the hydrocarbon-bearing formation is also increased (in some embodiments, by at least 5, 10, 15, 20, 30, 40, 50, 60, 70, 80, 90, or 100 percent or more) after treating the formation.

The hydrocarbon-bearing formation having both gas and liquid hydrocarbons may have gas condensate, black oil, or volatile oil and may comprise, for example, at least one of methane, ethane, propane, butane, pentane, hexane, heptane, octane, nonane, decane, or higher hydrocarbons. The term "black oil" refers to the class of crude oil typically having gas-oil ratios (GOR) less than about 2000 scf/stb (356 $m^3/m^3$). For example, a black oil may have a GOR in a range from about 100 (18), 200 (36), 300 (53), 400 (71), or 500 scf/stb (89 $m^3/m^3$) up to about 1800 (320), 1900 (338), or 2000 scf/stb (356 $m^3/m^3$). The term "volatile oil" refers to the class of crude oil typically having a GOR in a range between about 2000 and 3300 scf/stb (356 and 588 $m^3/m^3$). For example, a volatile oil may have a GOR in a range from about 2000 (356), 2100 (374), or 2200 scf/stb (392 $m^3/m^3$) up to about 3100 (552), 3200 (570), or 3300 scf/stb (588 $m^3/m^3$). In some embodiments, the treatment composition at least partially solubilizes or at least partially displaces the liquid hydrocarbons in the hydrocarbon-bearing formation.

Generally, for the treatment methods disclosed herein, the amounts of the fluorinated polymer and solvent (and type of solvent) is dependent on the particular application since conditions typically vary between wells, at different depths of individual wells, and even over time at a given location in an individual well. Advantageously, treatment methods according to the present disclosure can be customized for individual wells and conditions. For example, a method of making a treatment composition useful for practicing the methods disclosed herein may include receiving (e.g., obtaining or measuring) data comprising the temperature and at least one of the hydrocarbon composition or the brine composition (including the brine saturation level and components of the brine) of a selected geological zone of a hydrocarbon-bearing formation. These data can be obtained or measured using techniques well known to one of skill in the art. A formulation may then be generated based at least in part on compatibility information concerning the fluorinated polymer, the solvent, the temperature, and at least one of the hydrocarbon composition or brine composition of the selected geological zone of the formation. In some embodiments, the compatibility information comprises information concerning phase stability of a mixture of the fluorinated polymer, the solvent, and a model brine composition, wherein the model brine composition is based at least partially on the brine composition of the geological zone of the formation. The phase stability of a solution or dispersion can be evaluated using the phase behavior evaluation described above. The phase behavior can be evaluated over an extended period of time (e.g., 1 hour, 12 hours, 24 hours, or longer) to determine if any precipitation or cloudiness is observed. In some embodiments, the compatibility information comprises information concerning solid (e.g., salts or asphaltenes) precipitation from a mixture of the fluorinated polymer, the solvent, a model brine composition, and a model hydrocarbon composition, wherein the model brine composition is based at least partially on the brine composition of the geological zone of the formation, and wherein the model hydrocarbon composition is based at least partially on the hydrocarbon composition of the geological zone of the formation. In addition to using a phase behavior evaluation, it is also contemplated that one may be able obtain the compatibility information, in whole or in part, by computer simulation or by referring to previously determined, collected, and/or tabulated information (e.g., in a handbook or a computer database).

The hydrocarbon-bearing formations that may be treated according to the present disclosure may be siliciclastic (e.g., shale, conglomerate, diatomite, sand, and sandstone) or carbonate (e.g., limestone or dolomite) formations. In some embodiments, the hydrocarbon-bearing formation is predominantly sandstone (i.e., at least 50 percent by weight sandstone). In some embodiments, the hydrocarbon-bearing formation is predominantly limestone (i.e., at least 50 percent by weight limestone). The treatment methods are generally more versatile than other treatment methods which are effective with only certain substrates. For example, nonionic fluorinated polymeric surfactants have been demonstrated to be useful for treating siliciclastic (e.g., sandstone) formations and fractured formations containing proppants (see, e.g., U.S. Pat. No. 7,585,817 (Pope et al.) and U.S. Pat. No. 8,043,998 (Pope et al.)). However, such surfactants have been shown to have limited effectiveness on limestone; (see, e.g., Comparative Example A in U.S. Pat. Appl. Pub. No. 2011/0136704 (Sharma et al.), the disclosure of which example is incorporated herein by reference).

Methods according to the present disclosure may be practiced, for example, in a laboratory environment (e.g., on a core sample (i.e., a portion) of a hydrocarbon-bearing formation or in the field (e.g., on a subterranean hydrocarbon-bearing formation situated downhole). Typically, the methods disclosed herein are applicable to downhole conditions having a pressure in a range from about 1 bar (100 kPa) to about 1000 bars (100 MPa) and have a temperature in a range from about 100° F. (37.8° C.) to 400° F. (204° C.) although the methods are not limited to hydrocarbon-bearing formations having these conditions. Those skilled in the art, after reviewing the instant disclosure, will recognize that various factors may be taken into account in practice of the any of the disclosed methods including the ionic strength of the brine, pH (e.g., a range from a pH of about 4 to about 10), and the radial stress at the wellbore (e.g., about 1 bar (100 kPa) to about 1000 bars (100 MPa)).

In the field, treating a hydrocarbon-bearing formation with a treatment composition described herein can be carried out using methods (e.g., by pumping under pressure) well known to those skilled in the oil and gas art. Coil tubing, for example, may be used to deliver the treatment composition to a particular geological zone of a hydrocarbon-bearing formation. In some embodiments of practicing the methods described herein it may be desirable to isolate a geological zone (e.g., with conventional packers) to be treated with the composition.

Methods according to the present disclosure are useful, for example on both existing and new wells. Typically, it is believed to be desirable to allow for a shut-in time after compositions described herein are treated with the hydrocarbon-bearing formations. Exemplary shut-in times include a few hours (e.g., 1 to 12 hours), about 24 hours, or a few (e.g., 2 to 10) days. After the treatment composition has been allowed to remain in place for the desired time, the solvent present in the composition may be recovered from the formation by simply pumping fluids up tubing in a well as is commonly done to produce fluids from a formation.

In some embodiments of methods according to the present disclosure, the method comprises treating the hydrocarbon-bearing formation with a fluid before treating the hydrocarbon-bearing formation with the composition. In some embodiments, the fluid at least one of at least partially solubilizes or at least partially displaces the brine in the hydrocarbon-bearing formation. In some embodiments, the fluid at least partially solubilizes the brine. In some embodiments, the fluid at least partially displaces the brine. In some embodiments, the fluid at least one of at least partially solubilizes or displaces liquid hydrocarbons in the hydrocarbon-bearing formation. In some embodiments, the fluid is substantially free of fluorinated surfactants. The term "substantially free of fluorinated surfactants" refers to fluid that may have a fluorinated surfactant in an amount insufficient for the fluid to have a cloud point (e.g., when it is below its critical micelle concentration). A fluid that is substantially free of fluorinated surfactant may be a fluid that has a fluorinated surfactant but in an amount insufficient to alter the wettability of, for example, a hydrocarbon-bearing formation under downhole conditions. A fluid that is substantially free of fluorinated surfactant includes those that have a weight percent of such polymers as low as 0 weight percent. The fluid may be useful for decreasing the concentration of at least one of the salts present in the brine before introducing the composition to the hydrocarbon-bearing formation. The change in brine composition may change the results of a phase behavior evaluation (e.g., the combination of a treatment composition with a first brine before the fluid preflush may result in precipitation of salt or the fluorinated polymer while the combination of the treatment composition with the brine after the fluid preflush may result in no precipitation.)

In some embodiments of treatment methods disclosed herein, the fluid comprises at least one of toluene, diesel, heptane, octane, or condensate. In some embodiments, the fluid comprises at least one of water, methanol, ethanol, or isopropanol. In some embodiments, the fluid comprises at least one of a polyol or polyol ether independently having from 2 to 25 carbon atoms. In some embodiments, useful polyols have 2 to 20, 2 to 15, 2 to 10, 2 to 8, or 2 to 6 carbon atoms. In some embodiments, useful polyol ethers may have from 3 to 25 carbon atoms, 3 to 20, 3 to 15, 3 to 10, 3 to 8, or from 5 to 8 carbon atoms. Exemplary useful polyols and polyol ethers include any of those described above for solvents. In some embodiments, the fluid comprises at least one monohydroxy alcohol, ether, or ketone independently having up to four carbon atoms. In some embodiments, the fluid comprises at least one of nitrogen, carbon dioxide, or methane.

In some embodiments of the methods and treated hydrocarbon-bearing formations disclosed herein, the hydrocarbon-bearing formation has at least one fracture. In some embodiments, fractured formations have at least 2, 3, 4, 5, 6, 7, 8, 9, or 10 or more fractures. As used herein, the term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

In some embodiments of the methods disclosed herein, wherein treating the formation with the composition provides an increase in at least one of the gas permeability or the liquid permeability of the formation, the formation is a non-fractured formation (i.e., free of man-made fractures made, for example, by hydraulic fracturing). Advantageously, treatment methods disclosed herein typically provide an increase in at least one of the gas permeability or the hydrocarbon liquid permeability of the formation without fracturing the formation.

In some embodiments of the methods and treated hydrocarbon-bearing formations disclosed herein, wherein the hydrocarbon-bearing formation has at least one fracture, the fracture has a plurality of proppants therein. Before delivering the proppants into a fracture, the proppants may be treated with a fluorinated polymer or may be untreated (e.g., may comprise less than 0.1% by weight fluorinated polymer, based on the total weight of the plurality of proppants). In some embodiments, the fluorinated polymer useful in practicing the present disclosure is adsorbed on at least a portion of the plurality of proppants.

Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

Proppants useful in practicing the present disclosure may have a particle size in a range from 100 micrometers to 3000 micrometers (i.e., about 140 mesh to about 5 mesh (ANSI)) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), or 300 micrometers to 600 micrometers (i.e., about 50 mesh to about 30 mesh).

In some embodiments of methods of treating fractured formations, the proppants form packs within a formation and/or wellbore. Proppants may be selected to be chemically compatible with the solvents and compositions described herein. The term "proppant" as used herein includes fracture proppant materials introducible into the formation as part of a hydraulic fracture treatment and sand control particulate introducible into the wellbore or formation as part of a sand control treatment such as a gravel pack or frac pack.

In some embodiments, methods according to the present disclosure include treating the hydrocarbon-bearing formation with the composition at least one of during fracturing or after fracturing the hydrocarbon-bearing formation. In some of these embodiments, the fracturing fluid, which may contain proppants, may be aqueous (e.g., a brine) or may contain predominantly organic solvent (e.g., an alcohol or a hydrocarbon). In some embodiments, it may be desirable for the fracturing fluid to include contain viscosity enhancing agents (e.g., polymeric viscosifiers), electrolytes, corrosion inhibitors, scale inhibitors, and other such additives that are common to a fracturing fluid.

In some embodiments of methods of treating fractured formations, the amount of the composition introduced into the fractured formation is based at least partially on the volume of the fracture(s). The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation. Coil tubing, for example, may be used to deliver the treatment composition to a particular fracture. In some embodiments, in practicing the methods disclosed herein it may be desirable to isolate the fracture (e.g., with conventional packers) to be treated with the treatment composition.

In some embodiments, wherein the formation treated according to the methods described herein has at least one fracture, the fracture has a conductivity, and after the treatment composition treats at least one of the fracture or at least a portion of the plurality of proppants, the conductivity of the fracture is increased (e.g., by 25, 50, 75, 100, 125, 150, 175, 200, 225, 250, 275, or by 300 percent).

Fluorinated polymers may also be useful, for example, for treating proppants before using the proppants in a fracturing and propping operation. Treated proppants may be prepared, for example, by dissolving or dispersing the fluorinated polymer in a dispersing medium (e.g., water and/or organic solvent (e.g., alcohols, ketones, esters, alkanes and/or fluorinated solvents (e.g., hydrofluoroethers and/or perfluorinated carbons)) that is then applied to the particles. Optionally, a catalyst can be added (e.g., a Lewis acid or Lewis base). The amount of liquid medium used should be sufficient to allow the solution or dispersion to generally evenly wet the proppants being treated. Typically, the concentration of the fluorinated polymer in the solution or dispersion is the range from about 5% to about 20% by weight, although amounts outside of this range may also be useful. The proppants are typically treated with the fluorinated polymer solution or dispersion at temperatures in the range from about 25° C. to about 50° C., although temperatures outside of this range may also be useful. The treatment solution or dispersion can be applied to the proppants using techniques known in the art for applying solutions or dispersions to proppants (e.g., mixing the solution or dispersion and proppants in a vessel (in some embodiments under reduced pressure) or spraying the solutions or dispersions onto the particles). After application of the treatment solution or dispersion to the particles, the liquid medium can be removed using techniques known in the art (e.g., drying the particles in an oven). Typically, about 0.1 to about 5 (in some embodiments, for example, about 0.5 to about 2) percent by weight fluorinated polymer is added to the particles, although amounts outside of this range may also be useful.

Referring to FIG. 1, an exemplary offshore oil platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

While the drawing depicts an offshore operation, the skilled artisan will recognize that the methods for treating a production zone of a wellbore are equally well-suited for use in onshore operations. Also, while the drawing depicts a vertical well, the skilled artisan will also recognize that methods according to the present disclosure are equally well-suited for use in deviated wells, inclined wells or horizontal wells.

Some Embodiments of the Disclosure

In a first embodiment, the present disclosure provides a method comprising contacting a hydrocarbon-bearing formation with a treatment composition comprising solvent and a fluorinated polymer, wherein the fluorinated polymer comprises:

a first divalent unit represented by formula:

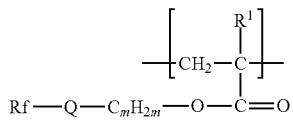

wherein
Rf represents a fluoroalkyl group having from 1 to 8 carbon atoms;
each $R^1$ is independently hydrogen or methyl;
Q is a bond or —$SO_2$—N(R)—, wherein R is alkyl having from 1 to 4 carbon atoms; and
m is an integer from 1 to 11,
a second divalent unit comprising a poly(alkyleneoxy) group; and
a third divalent unit comprising a pendant ionic group, wherein at least one of the following conditions is met:
the solvent comprises not more than ten percent by weight methanol and not more than 25 percent by weight water, based on the total weight of the solvent; or
the solvent solubilizes or displaces brine in the hydrocarbon-bearing formation.

In a second embodiment, the present disclosure provides the method of the first embodiment, wherein the second divalent unit is present in an amount of at least 30 by weight, based on the total weight of the fluorinated polymer.

In a third embodiment, the present disclosure provides the method according to the first or second embodiment, wherein Q is —$SO_2N(R)$— and R is methyl or ethyl.

In a fourth embodiment, the present disclosure provides the method according to any one of the first to third embodiments, wherein Rf represents a fluoroalkyl group having up to 4 carbon atoms.

In a fifth embodiment, the present disclosure provides the method according to any one of the fourth embodiment, wherein the fluorinated polymer further comprises at least one divalent unit represented by formula:

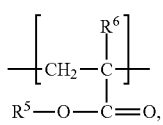

wherein each $R^5$ is independently alkyl having from 1 to 30 carbon atoms; and each $R^6$ is independently hydrogen or methyl.

In a sixth embodiment, the present disclosure provides the method according to any one of the first to fifth embodiments, wherein the second divalent unit is represented by formula:

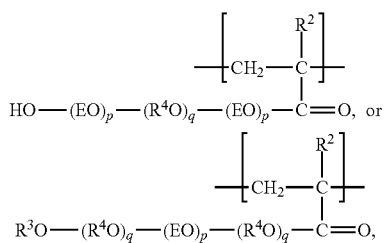

wherein each $R_2$ is independently hydrogen or methyl;

each $R_3$ is independently alkyl having up to 4 carbon atoms or hydrogen;

EO represents —$CH_2CH_2O$—;

each $R^4O$ is independently selected from the group consisting of —$CH(CH_3)CH_2O$—, —$CH_2CH_2CH_2O$—, —$CH_2CH(CH_3)O$—, —$CH_2CH_2CH_2CH_2O$—, —$CH(CH_2CH_3)CH_2O$—, —$CH_2CH(CH_2CH_3)O$—, and —$CH_2C(CH_3)_2O$—;

each p is independently a value from 0 to 150; and each q is independently a value from 0 to 150, wherein p+q is at least 5.

In a seventh embodiment, the present disclosure provides the method according to any one of the first to sixth embodiments, wherein the second divalent unit is represented by formula:

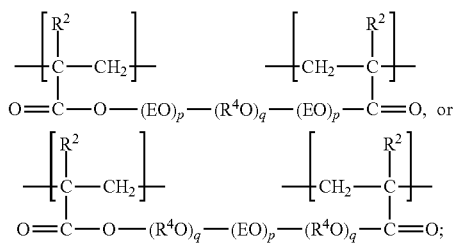

wherein each $R_2$ is independently hydrogen or methyl;

EO represents —$CH_2CH_2O$—;

each $R^4O$ is independently selected from the group consisting of —$CH(CH_3)CH_2O$—, —$CH_2CH_2CH_2O$—, —$CH_2CH(CH_3)O$—, —$CH_2CH_2CH_2CH_2O$—, —$CH(CH_2CH_3)CH_2O$—, —$CH_2CH(CH_2CH_3)O$—, and —$CH_2C(CH_3)_2O$—;

each r is independently a value from 0 to 150; and each q is independently a value from 0 to 150, wherein p+q is at least 150.

In an eighth embodiment, the present disclosure provides the method according to any one of the first to seventh embodiments, wherein the second divalent unit comprises a pendant poly(alkyleneoxy) group.

In a ninth embodiment, the present disclosure provides the method according to any one of the first to eighth embodiments, wherein the third divalent unit is represented by formula:

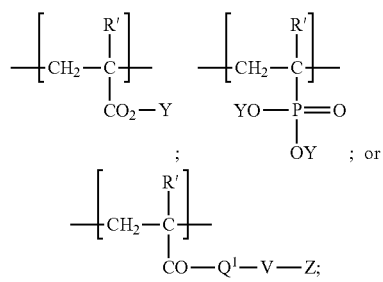

wherein $Q^1$ is selected from the group consisting of —O—, —S—, and —$N(R^7)$—;

each $R^7$ is independently selected from the group consisting of hydrogen and alkyl having from 1 to 4 carbon atoms;

each R' is independently hydrogen or methyl;

V is alkylene that is optionally interrupted by at least one ether linkage or amine linkage;

Z is selected from the group consisting of —$P(O)(OY)_2$, —O—$P(O)(OY)_2$, —$SO_3Y$, and $CO_2Y$; and each Y is independently selected from the group consisting of hydrogen, a counter cation, and a bond to the hydrocarbon-bearing formation.

In a tenth embodiment, the present disclosure provides the method according to any one of the first to ninth embodiments, wherein the third divalent unit is represented by formula:

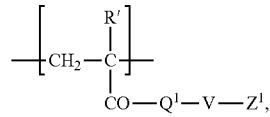

wherein $Q^1$ is selected from the group consisting of —O—, —S—, and —$N(R^7)$—;

each $R^7$ is independently selected from the group consisting of hydrogen and alkyl having from 1 to 4 carbon atoms;

each R' is independently hydrogen or methyl;

V is alkylene that is optionally interrupted by at least one ether linkage or amine linkage; and $Z^1$ is selected from the group consisting of —$[N(R^8)_3]^+$ $M^-$, —$N^+(R^8)_2$—$(CH_2)_g$—$SO_3Y^1$, and —$N^+(R^8)_2$—$(CH_2)_g$—$CO_2Y^1$, wherein each $R^8$ is independently selected from the group consisting of hydrogen and alkyl having from 1 to 6 carbon atoms;

each g is independently an integer from 2 to 6;

M⁻ is a counter anion; and

Y¹ is selected from the group consisting of hydrogen and a free anion.

In an eleventh embodiment, the present disclosure provides the method according to any one of the first to tenth embodiments, wherein the fluorinated polymer is free of divalent units comprising a pendant silane group and free of silane terminal groups.

In a twelfth embodiment, the present disclosure provides the method according to any one of the first to eleventh embodiments, wherein the fluorinated polymer is free of pendent amino groups.

In a thirteenth embodiment, the present disclosure provides the method according to any one of the first to twelfth embodiments, wherein the hydrocarbon-bearing formation comprises at least one of limestone, dolomite, sandstone, shale, conglomerate, diatomite, or sand.

In a fourteenth embodiment, the present disclosure provides the method according to any one of the first to thirteenth embodiments, wherein the hydrocarbon-bearing formation has at least one fracture, and wherein the fracture has a plurality of proppants therein.

In a fifteenth embodiment, the present disclosure provides the method according to the fourteenth embodiment, wherein the plurality of proppants comprises ceramic proppants.

In a sixteenth embodiment, the present disclosure provides the method according to the fifteenth embodiment, wherein the plurality of proppants comprises bauxite proppants.

In a seventeenth embodiment, the present disclosure provides the method according to any one of the first to thirteenth embodiments, wherein the method does not include intentionally fracturing the hydrocarbon-bearing formation.

In an eighteenth embodiment, the present disclosure provides the method according to any one of the first to thirteenth embodiments, wherein the hydrocarbon-bearing formation is free of manmade fractures.

In a nineteenth embodiment, the present disclosure provides the method according to any one of the first to eighteenth embodiments, wherein the solvent comprises at least one of water, an alcohol, an ether, or a ketone, wherein the alcohol, ether, and ketone each independently have up to 4 carbon atoms.

In a twentieth embodiment, the present disclosure provides the method according to any one of the first to nineteenth embodiments, wherein the solvent comprises at least one of a polyol or polyol ether independently having from 2 to 25 carbon atoms.

In a twenty-first embodiment, the present disclosure provides the method according to any one of the first to twentieth embodiments, wherein before contacting the hydrocarbon-bearing formation with the treatment composition, the hydrocarbon-bearing formation has at least one of brine or liquid hydrocarbons, and wherein the hydrocarbon-bearing formation has at least a gas permeability that is increased after it is contacted with the treatment composition.

In a twenty-second embodiment, the present disclosure provides the method according to any one of the first to twenty-first embodiments, further comprising contacting the hydrocarbon-bearing formation with a fluid before contacting the hydrocarbon-bearing formation with the treatment composition, wherein the fluid at least one of at least partially solubilizes or partially displaces at least one of the brine or liquid hydrocarbons in the hydrocarbon-bearing formation.

In a twenty-third embodiment, the present disclosure provides the method according to any one of the first to twenty-second embodiments, wherein the hydrocarbon-bearing formation is penetrated by a wellbore, and wherein a region near the wellbore is contacted with the treatment composition.

In a twenty-fourth embodiment, the present disclosure provides the method according to any one of the first to twenty-third embodiments, wherein the fluorinated polymer is a polymer having a weight average molecular weight in a range from 1,000 grams per mole to 100,000 grams per mole.

In a twenty-fifth embodiment, the present disclosure provides a hydrocarbon-bearing formation treated according to the method of any one of the first to twenty-fourth embodiments.

Embodiments of the methods disclosed herein are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight.

Examples

In the following Preparations, MeFBSEA was prepared according to the method of U.S. Pat. No. 6,664,354 (Savu), Example 2, Parts A and B, incorporated herein by reference, except using 4270 kilograms (kg) of N-methylperfluorobutanesulfonamidoethanol, 1.6 kg of phenothiazine, 2.7 kg of methoxyhydroquinone, 1590 kg of heptane, 1030 kg of acrylic acid, 89 kg of methanesulfonic acid (instead of triflic acid), and 7590 kg of water in Part B.

In the following Preparations, a monoacrylate of block copolymer of ethylene oxide and propylene oxide (obtained under the trade designation "PLURONIC L-44" from BASF Corporation, Ludwigshafen, Germany) was prepared according to the method of Example 1 of U.S. Pat. No. 3,787,351 (Olson), incorporated herein by reference, except that a 1:1 molar ratio of acrylic acid and the block copolymer was used.

In the following Preparations, an acrylate of a methoxy endcapped polyethyleneglycol with average weight MW of 750 ("CW 750A") was prepared according to the method of U.S. Pat. No. 3,728,151 (Sherman et al), Example 17, incorporated herein by reference.

Comparative Preparation A:

Into a 250-mL, three-necked flask was added 30 grams of MeFBSEA, 140 grams of a 50% solution of the monoacrylate of block copolymer "PLURONIC L44", 30 grams of toluene, 5 grams of 3-mercapto-1,2-propanediol, and 0.75 gram of 2,2'-azobis(2-methylbutyronitrile) (obtained under the trade designation "VAZO-67" from E. I. DuPont de Nemours & Co., Wilmington, Del.). The mixture was degassed three times using vacuum and nitrogen pressure and then heated up to 75° C. for 6 hours. An additional 0.1 g of "VAZO-67" was then added and the reaction was allowed to continue for 16 hours. An additional 0.1 g of "VAZO-67" was then added and the reaction was allowed to continue for 6 hours. The product was filtered, and the toluene was removed using an aspirator vacuum at 70-90° C. at about 30 mmHg (4000 Pa). A clear amber, viscous liquid was obtained. Residual MeFBSEA was checked with GLC and found to be about 0.1% by weight.

Preparation 1:

a cationic polymeric fluorosurfactant was prepared by adding the following ingredients to a three-necked flask of 250 ml fitted with a condenser, stirrer, heating mantle and thermometer: 15 g of MeFBSEA, 65 g of a 50% solution of the monoacrylate of block copolymer "PLURONIC L44", 2.5 g dimethylaminoethylmethacrylate (DMAEMA), 1.5 g of 3-mercaptopropanediol, 15 g of toluene, and 0.2 g of 2,2'-azobis(2-methylbutyronitrile) (obtained under the trade designation "VAZO-67" from E. I. DuPont de Nemours & Co.). The mixture was degassed three times using an aspirator vacuum and nitrogen pressure and then heated up to 75° C. for 4 hours under nitrogen atmosphere. An additional 0.05 g of "VAZO-67" was then added and the reaction was allowed to continue for 16 hours. The mixture was cooled to about 40° C. and 2.4 g of diethyl sulfate was added. The reaction was continued for 3 hours at 70° C. under nitrogen. Solvent was stripped off using the aspirator vacuum at 70-90° C. A viscous polymeric cationic fluorochemical surfactant was obtained.

Preparation 2:

a polymeric amphoteric surfactant containing nonionic and amphoteric groups was prepared according to the procedure outlined in Preparation 1, except that the 2.5 g of DMAEMA were reacted with 1.8 g of 1,3-propanesultone (PS).

Preparation 3:

a polymeric cationic surfactant containing nonionic and cationic groups was prepared according to the procedure outlined in Preparation 1, except that the mixture comprised the following ingredients: 15 g of MeFBSEA, 17.5 g of CW 750A, 12.5 g of isooctylacrylate (IOA) and 5 g of DMAEMA quaternized with 4.9 g of diethyl sulfate (DES).

Preparation 4:

a polymeric cationic surfactant containing nonionic and cationic groups was prepared according to the procedure outlined in Preparation 1, except that no MeFBSEA was used and 15 g of 3-(perfluorohexyl)-2-hydroxypropylacrylate (obtained from ABCR, Germany) were used instead.

Preparation 5:

a polymeric anionic surfactant containing nonionic and anionic groups was prepared according to the procedure outlined in Preparation 1, except that no DMAEMA was used and 2.5 g of acrylic acid neutralized with 3.6 g of diethanolamine were added to the mixture instead.

Preparation 6:

a polymeric anionic surfactant containing nonionic and anionic groups was prepared according to the procedure outlined in Preparation 1, except that no DMAEMA was used and 2.5 g of 2-acrylamido-2-methyl-1-propanesulfonic acid (AMPS) neutralized with 0.5 g of NaOH in 20 g methanol were added to the mixture instead.

Comparative Preparation B:

a polymeric amphoteric surfactant containing nonionic and amine-oxide groups was prepared according to the procedure outlined in Preparation 1, except that (i) the amount of "PLURONIC L-44" acrylate in toluene used was 60 g, (ii) an additional charge of 5 g of DMAEMA was added, and (iii) 5.4 g of a 30% solution of $H_2O_2$ in water was added to the mixture after the toluene strip and reacted for 6 hours at 60° C.

Comparative Examples A and B and Examples 1-4

1) Treatment Composition Preparation

For Comparative Treatment Composition A (Comp. T A), Treatment Compositions (TC) 1-4, and Comparative Treatment Composition B each of, respectively, Comparative Preparation A and Preparations 1-4, and Comparative Preparation B were combined at 1% by weight with 2-butoxyethanol (69.5% by weight) and ethanol (29.5% by weight) to prepare about 200 grams of treatment solution, as outlined in Table 1, below. The components were mixed together using a magnetic stirrer and a magnetic stir bar.

TABLE 1

| Treatment Composition | Preparation |
| --- | --- |
| Comparative Treatment Composition A | Comparative Preparation A |
| Treatment Composition 1 | Preparation 1 |
| Treatment Composition 2 | Preparation 2 |
| Treatment Composition 3 | Preparation 3 |
| Comparative Treatment Composition B | Comparative Preparation B |
| Treatment Composition 4 | Preparation 4 |

2) Flow Setup and Procedure

Figure 2:
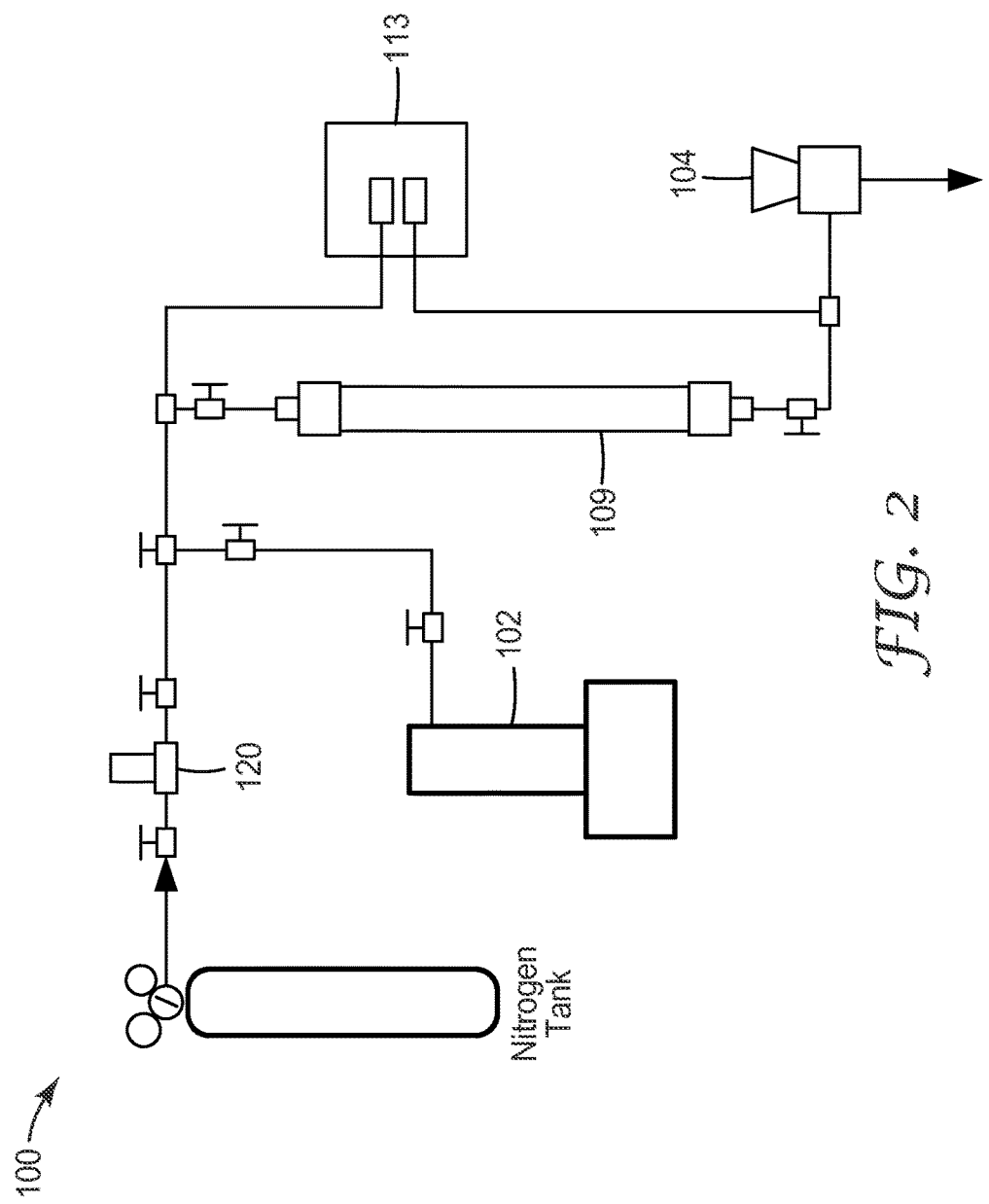
FIG. 2 is a schematic illustration of the flow apparatus used for Examples 1 to 11 and Control or Comparative Examples A to F.

A schematic diagram of a flow apparatus 100 used to determine relative permeability of sea sand or particulate calcium carbonate is shown in FIG. 2. Flow apparatus 100 included positive displacement pump 102 (Model Gamma/4-W 2001 PP, obtained from Prolingent AG, Regensdorf, Germany) to inject n-heptane at constant rate. Nitrogen gas was injected at constant rate through a gas flow controller 120 (Model DK37/MSE, Krohne, Duisburg, Germany) Pressure indicators 113, obtained from Siemens under the trade designation "SITRANS P" 0-16 bar, were used to measure the pressure drop across a sea sand pack in vertical core holder 109 (20 cm by 12.5 cm$^2$) (obtained from 3M Company, Antwerp, Belgium). A back-pressure regulator (Model No. BS(H)2; obtained from RHPS, The Netherlands) 104 was used to control the flowing pressure upstream and downstream of core holder 109. Core holder 109 was heated by circulating silicone oil, heated by a heating bath obtained from Lauda, Switzerland, Model R22.

The core holder was filled with sea sand (obtained from Aldrich, Bornem, Belgium, grade 10 to 20 mesh) and then heated to 85° C. The temperature of 85° C. was maintained for each of the flows described below. A pressure of about 5 bar (5×10$^5$ Pa) was applied, and the back pressure was regulated in such a way that the flow of nitrogen gas through the sea sand was about 500 to 1000 mL/minute. The initial gas permeability was calculated using Darcy's law.

Synthetic brine according to the natural composition of North Sea brine, was prepared by mixing 5.9% sodium chloride, 1.6% calcium chloride, 0.23% magnesium chloride, and 0.05% potassium chloride and distilled water up to 100% by weight. The brine was then introduced into the core holder at about 1 mL/minute using displacement pump 102.

Heptane was then introduced into the core holder at about 0.5 mL/minute using displacement pump 102. Nitrogen and n-heptane were co-injected into the core holder until steady state was reached.

The treatment composition was then injected into the core at a flow rate of 1 mL/minute for about one pore volume. The gas permeability after treatment was calculated from the steady state pressure drop, and improvement factor was calculated as the permeability after treatment/permeability before treatment.

At least 10 pore volumes of heptanes were then injected. Gas permeability and improvement factor were again calculated.

For Comparative Example A and Examples 1-4, the preparation used for each injection, initial pressure, pressure change (AP), flow rate for each injection, the amount of liquid used for each injection, the flow rate of gas through the core (Q), the gas permeability (K), and the improvement factor (PI) are shown in Table 2, below.

Control Example A

Control Example A was carried out according to the method of Comparative Examples A and B and Examples 1-4, with the exception that the Control Treatment Composition (Control TC) only contained 2-butoxyethanol (70% by weight) and ethanol (30% by weight). The liquid used for each injection, initial pressure, pressure change (AP), flow rate for each injection, the amount of liquid used for each injection, the flow rate of gas through the core (Q), the gas permeability (K), and the improvement factor (PI) are also shown in Table 2, below.

weight) to prepare about 200 grams of treatment solution, as outlined in Table 3, below. The components were mixed together using a magnetic stirrer and a magnetic stir bar.

TABLE 3

| Treatment Composition | Preparation |
|---|---|
| Comparative Treatment Composition A | Comparative Preparation A |
| Treatment Solution 5 | Preparation 5 |
| Treatment Solution 6 | Preparation 6 |
| Comparative Treatment Composition B | Comparative Preparation B |

2) Flow Setup and Procedure

Comparative Examples C and D and Examples 5 and 6 were carried out according to the flow setup and procedure of Comparative Examples A and B and Examples 1-4,

TABLE 2

| Example | Liquid | Pressure (initial) | ΔP | Flow (mL/min) | Amount Liquid (g) | Q (mL/sec) | K (Darcy) | PI |
|---|---|---|---|---|---|---|---|---|
| Comp. Ex. A | — | 4.94 | 0.01 | 530 | | 8.83 | 24.03 | |
| | NS brine | 5.01 | 0.151 | 500 | 41 | 9.01 | 1.62 | |
| | Heptane | 5.03 | 0.141 | 420 | 77 | 7.53 | 1.45 | |
| | Comp. TC A | 5.05 | 0.063 | 380 | 122 | 6.54 | 2.82 | 1.95 |
| | Heptane | 5.04 | 0.065 | 420 | 266 | 7.22 | 3.02 | 2.08 |
| Control Ex. A | — | 3.84 | 0.01 | 940 | | 15.66 | 42.6 | |
| | NS brine | 3.99 | 0.09 | 440 | 50 | 7.66 | 2.31 | |
| | Heptane | 3.97 | 0.09 | 430 | 93 | 7.5 | 2.17 | |
| | Control TC | 3.98 | 0.047 | 440 | 125 | 7.50 | 4.34 | 2.00 |
| | Heptane | 3.99 | 0.082 | 440 | 317 | 7.63 | 2.53 | 1.16 |
| Example 1 | — | 5.1 | 0.01 | 690 | | 11.5 | 31.3 | |
| | NS brine | 5.24 | 0.058 | 590 | 50 | 10.1 | 4.73 | |
| | Heptane | 5.24 | 0.06 | 630 | 58 | 10.8 | 4.91 | |
| | TC 1 | 5.26 | 0.03 | 630 | 110 | 10.7 | 9.7 | 2.0 |
| | Heptane | 5.25 | 0.025 | 660 | 308 | 11.1 | 12.1 | 2.48 |
| Example 2 | — | 5.1 | 0.01 | 680 | | 11.3 | 30.8 | |
| | NS brine | 5.23 | 0.150 | 560 | 54 | 10.1 | 1.83 | |
| | Heptane | 5.29 | 0.141 | 630 | 63 | 9.68 | 1.88 | |
| | TC 2 | 5.30 | 0.091 | 750 | 105 | 13.0 | 3.84 | 2.0 |
| | Heptane | 5.29 | 0.087 | 750 | 319 | 13.0 | 4.0 | 2.21 |
| Example 3 | — | 4.99 | 0.01 | 600 | | 10.0 | 27.2 | |
| | NS brine | 5.13 | 0.158 | 500 | 64 | 9.05 | 1.56 | |
| | Heptane | 5.10 | 0.147 | 500 | 73 | 8.99 | 1.66 | |
| | TC 3 | 5.14 | 0.061 | 480 | 96 | 8.25 | 3.74 | 2.24 |
| | Heptane | 5.16 | 0.063 | 500 | 289 | 8.59 | 3.71 | 2.23 |
| Comp. Ex. B | — | 4.82 | 0.01 | 460 | | 7.66 | 20.9 | |
| | NS brine | 4.98 | 0.131 | 400 | 52 | 7.1 | 1.46 | |
| | Heptane | 5.02 | 0.133 | 380 | 70 | 6.78 | 1.39 | |
| | Comp. TC B | 5.00 | 0.054 | 380 | 103 | 6.51 | 3.28 | 2.36 |
| | Heptane | 5.02 | 0.059 | 370 | 290 | 6.35 | 2.92 | 2.10 |
| Example 4 | — | 5.04 | 0.01 | 480 | | 8.0 | 21.76 | |
| | NS brine | 5.29 | 0.128 | 400 | 45 | 7.12 | 1.51 | |
| | Heptane | 5.30 | 0.132 | 380 | 80 | 6.78 | 1.40 | |
| | TC 4 | 5.32 | 0.067 | 410 | 100 | 7.06 | 2.86 | 2.05 |
| | Heptane | 5.34 | 0.063 | 400 | 346 | 6.87 | 2.96 | 2.11 |

Comparative Examples C and D and Examples 5-6

1) Treatment Solution Preparation

For Comparative Treatment Composition A (Comp. TC C), Treatment Compositions (TS) 5 and 6, and Comparative Treatment Composition B, each of, respectively, Comparative Preparation A, Preparation 5, Preparation 6 and Comparative Preparation B was combined at 1% by weight with 2-butoxyethanol (69.5% by weight) and ethanol (29.5% by except that the sea sand in the core was replaced with calcium carbonate (obtained from Merck, Darmstadt, Germany as granular marble, particle size in a range from 0.5 mm to 2 mm) For Comparative Examples C and D and Examples 5 and 6, the liquid used for each injection, initial pressure, the pressure change (AP), flow rate for each injection, the amount of liquid used for each injection, the flow rate of gas through the core (Q), the gas permeability (K), and the improvement factor (PI) are shown in Table 4, below.

TABLE 4

| Example | Liquid | Pressure (initial) | ΔP | Flow (mL/min) | Amount Liquid (g) | Q | K | PI |
|---|---|---|---|---|---|---|---|---|
| Control | — | 5.03 | 0.01 | 580 | | 9.67 | 26.29 | |
| Ex. B | NS brine | 5.44 | 0.15 | 500 | 48 | 9.01 | 1.63 | |
| | Heptane | 5.39 | 0.105 | 420 | 60 | 7.35 | 1.9 | |
| | Control TC | 5.66 | 0.074 | 450 | 100 | 7.79 | 2.86 | 1.50 |
| | Heptane | 5.35 | 0.102 | 380 | 150 | 6.64 | 1.77 | 0.93 |
| Comp. | — | 5.14 | 0.01 | 570 | | 9.5 | 25.84 | |
| Ex. C | NS brine | 5.31 | 0.139 | 500 | 52 | 8.96 | 1.75 | |
| | Heptane | 5.57 | 0.133 | 480 | 62 | 8.57 | 1.75 | |
| | Comp. TC A | 5.67 | 0.062 | 340 | 110 | 5.85 | 2.66 | 1.52 |
| | Heptane | 5.65 | 0.097 | 440 | 276 | 7.68 | 2.15 | 1.23 |
| Example 5 | — | 5.05 | 0.01 | 500 | | 8.3 | 22.7 | |
| | NS brine | 5.33 | 0.126 | 400 | 40 | 7.13 | 1.54 | |
| | Heptane | 5.35 | 0.124 | 400 | 80 | 7.13 | 1.56 | |
| | TC 5 | 5.38 | 0.062 | 400 | 103 | 6.68 | 3.0 | 1.93 |
| | Heptane | 5.37 | 0.066 | 410 | 325 | 7.06 | 2.91 | 1.86 |
| Example 6 | — | 4.54 | 0.01 | 520 | | 8.67 | 23.57 | |
| | NS brine | 4.92 | 0.114 | 410 | 44 | 7.25 | 1.73 | |
| | Heptane | 4.95 | 0.105 | 480 | 80 | 8.44 | 2.19 | |
| | TC 6 | 4.97 | 0.055 | 480 | 106 | 8.23 | 4.07 | 1.86 |
| | Heptane | 4.96 | 0.058 | 490 | 335 | 8.40 | 3.94 | 1.80 |
| Comp. | — | 5.11 | 0.01 | 600 | | 10.0 | 27.2 | |
| Ex. D | NS brine | 5.23 | 0.066 | 630 | 54 | 10.9 | 4.47 | |
| | Heptane | 5.25 | 0.06 | 480 | 58 | 8.2 | 3.74 | |
| | Comp. TC B | 5.35 | 0.027 | 360 | 107 | 6.06 | 6.1 | 1.63 |
| | Heptane | 5.34 | 0.029 | 400 | 320 | 6.76 | 6.34 | 1.70 |

Control Example B

Control Example B was carried out using the Control Treatment Composition (Control TC) and the flow setup and procedure of Comparative Examples C and D and Examples 5 and 6. Results are shown in Table 4, above.

Comparative Examples E and F and Examples 7 and 8

1) Treatment Composition Preparation

For Comparative Treatment Composition A (Comp. TC A), Treatment Compositions (TC) 7 and 8, and Comparative Treatment Composition B, each of, respectively, Comparative Preparation A, Preparation 1, Preparation 5, and Comparative Preparation B, were combined at 1% by weight with 2-butoxyethanol (69.5% by weight) and ethanol (29.5% by weight) to prepare about 200 grams of treatment solution, as outlined in Table 5, below. The components were mixed together using a magnetic stirrer and a magnetic stir bar.

TABLE 5

| Treatment Composition | Preparation |
|---|---|
| Comparative Treatment Composition A | Comparative Preparation A |
| Treatment Composition 7 | Preparation 1 |
| Treatment Composition 8 | Preparation 5 |
| Comparative Treatment Composition B | Comparative Preparation B |

2) Flow Setup and Procedure

Comparative Examples E and F and Examples 7 and 8 were carried out according to the flow setup and procedure of Comparative Examples A and B and Examples 1-4, except that the sea sand in the core was replaced with bauxite proppant (obtained from Sintex Mineral and Services, Houston, Tex., under the trade designation "SINTEX 30/50"). For Comparative Examples E and F and Examples 7 and 8, the liquid used for each injection, initial pressure, the pressure change (ΔP), flow rate for each injection, the amount of liquid used for each injection, the flow rate of gas through the core (Q), the gas permeability (K), and the improvement factor (PI) are shown in Table 6, below.

Control Example C

Control Example C was carried out using the Control Treatment Composition (Control TC) and using the flow setup and procedure of Comparative Examples E and F and Examples 7 and 8. Results are shown in Table 6, below.

TABLE 6

| Example | Liquid | Pressure (initial) | ΔP | Flow (mL/min) | Amount Liquid (g) | Q | K | PI |
|---|---|---|---|---|---|---|---|---|
| Control | — | 2.74 | 0.01 | 930 | | 15.5 | 42.16 | |
| Ex. C | NS brine | 2.82 | 0.083 | 600 | 46 | 10.42 | 3.41 | |
| | Heptane | 2.84 | 0.089 | 510 | 80 | 8.88 | 2.71 | |
| | Control TC | 2.81 | 0.037 | 520 | 160 | 8.82 | 6.48 | 2.39 |
| | Heptane | 2.89 | 0.075 | 350 | 280 | 6.05 | 2.19 | 0.81 |
| Comp. | — | 3.82 | 0.01 | 800 | | 13.33 | 36.26 | |
| Ex. E | NS brine | 3.85 | 0.085 | 630 | 43 | 10.95 | 3.50 | |
| | Heptane | 3.87 | 0.081 | 565 | 42 | 9.79 | 3.28 | |
| | Comp. TC A | 3.90 | 0.038 | 490 | 120 | 8.32 | 5.95 | 1.81 |
| | Heptane | 3.90 | 0.038 | 470 | 220 | 7.98 | 5.71 | 1.75 |

TABLE 6-continued

| Example | Liquid | Pressure (initial) | ΔP | Flow (mL/min) | Amount Liquid (g) | Q | K | PI |
|---|---|---|---|---|---|---|---|---|
| Example 7 | — | 3.76 | 0.01 | 900 | | 15.0 | 40.8 | |
| | NS brine | 3.91 | 0.076 | 370 | 56 | 6.40 | 2.29 | |
| | Heptane | 3.90 | 0.073 | 400 | 70 | 6.90 | 2.57 | |
| | TC 7 | 3.89 | 0.038 | 450 | 97 | 7.64 | 5.47 | 2.12 |
| | Heptane | 3.89 | 0.039 | 440 | 350 | 7.47 | 5.21 | 2.03 |
| Example 8 | — | 3.80 | 0.01 | 960 | | 16.0 | 43.52 | |
| | NS brine | 3.95 | 0.072 | 420 | 69 | 7.25 | 2.74 | |
| | Heptane | 3.96 | 0.072 | 440 | 111 | 7.60 | 2.87 | |
| | TC 8 | 3.96 | 0.036 | 470 | 101 | 7.97 | 6.02 | 2.10 |
| | Heptane | 3.96 | 0.034 | 460 | 310 | 7.79 | 6.23 | 2.17 |
| Comp. Ex. F | — | 3.81 | 0.01 | 960 | | 16.0 | 43.52 | |
| | NS brine | 3.91 | 0.070 | 540 | 57 | 9.31 | 3.61 | |
| | Heptane | 3.88 | 0.072 | 540 | 51 | 9.32 | 3.52 | |
| | Comp. TC B | 3.90 | 0.035 | 580 | 120 | 9.83 | 7.64 | 2.17 |
| | Heptane | 3.88 | 0.034 | 560 | 326 | 9.49 | 7.59 | 2.14 |

Figure 3:
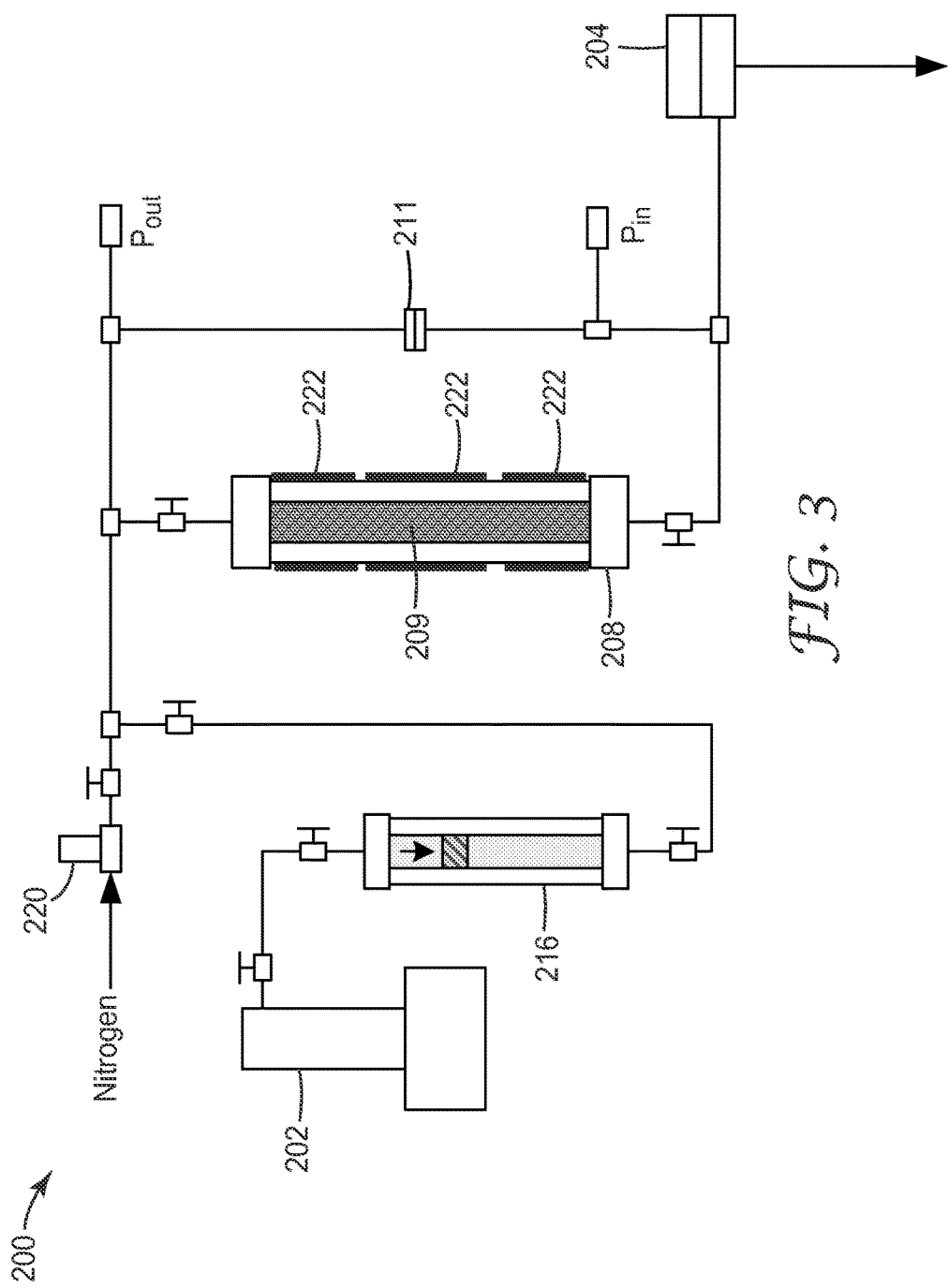
FIG. 3 is a schematic illustration of a core flood set-up that can be useful for evaluating the method disclosed herein in a laboratory.

The results of these flow evaluations can be verified using core flood evaluations on core samples. A schematic diagram of a core flood apparatus 200 that can be used is shown in FIG. 3. Core flood apparatus 200 includes positive displacement pump 202 (Model QX6000SS, obtained from Chandler Engineering, Tulsa, Okla.) to inject n-heptane at constant rate into fluid accumulators 216. Nitrogen gas can be injected at constant rate through a gas flow controller 220 (Model 5850 Mass Flow Controller, Brokks Instrument, Hatfield, Pa.). A pressure port 211 on high-pressure core holder 208 (Hassler-type Model RCHR-1.0 obtained from Temco, Inc., Tulsa, Okla.) can be used to measure pressure drop across the vertical core 209. A back-pressure regulator (Model No. BP-50; obtained from Temco, Tulsa, Okla.) 204 can be used to control the flowing pressure downstream of core 209. High-pressure core holder 208 can be heated with 3 heating bands 222 (Watlow Thinband Model STB4A2AFR-2, St. Louis, Mo.).

In a typical procedure, a core can be dried for 72 hours in a standard laboratory oven at 95° C. and then wrapped in aluminum foil and heat shrink tubing. Referring again to FIG. 3, the wrapped core 209 can placed in core holder 208 at the desired temperature. An overburden pressure of, for example, 2300 psig ($1.6 \times 10^7$ Pa) can be applied. The initial single-phase gas permeability can be measured using nitrogen at low system pressures between 5 to 10 psig ($3.4 \times 10^4$ to $6.9 \times 10^4$ Pa).

Deionized water or brine can be introduced into the core 209 by the following procedure to establish the desired water saturation. The outlet end of the core holder is connected to a vacuum pump and a full vacuum can be applied for 30 minutes with the inlet closed. The inlet can be connected to a burette with the water in it. The outlet is closed and the inlet is opened to allow 2.1 mL of water to flow into the core. The inlet and the outlet valves can then be closed for the desired time. The gas permeability can be measured at the water saturation by flowing nitrogen at 500 psig ($3.4 \times 10^6$ Pa).

The core holder 208 can then be heated to a higher temperature, if desired, for several hours. Nitrogen and n-heptane can be co-injected into the core at an average total flow rate in the core of, for example, 450 mL/hour at a system pressure of, for example, 900 psig ($6.2 \times 10^6$ Pa) until steady state is reached. The flow rate of nitrogen is controlled by gas flow controller 220, and the rate for n-heptane is controlled by positive displacement pump 202. The flow rates of nitrogen and n-heptane can be set such that the fractional flow of gas in the core was 0.66. The gas relative permeability before treatment can then be calculated from the steady state pressure drop. The treatment composition can then be injected into the core at a flow rate of, for example, 120 mL/hour for about 20 pore volumes. Nitrogen and n-heptane co-injection can be resumed at an average total flow rate in the core of, for example, 450 mL/hour at a system pressure of, for example, 900 psig ($6.2 \times 10^6$ Pa) until steady state is reached. The gas relative permeability after treatment can then be calculated from the steady state pressure drop.

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A method comprising contacting a hydrocarbon-bearing formation with a treatment composition comprising solvent and a fluorinated polymer, wherein the fluorinated polymer comprises:

a first divalent unit represented by formula:

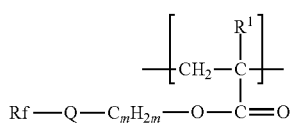

wherein

Rf represents a fluoroalkyl group having from 1 to 8 carbon atoms;

each $R^1$ is independently hydrogen or methyl;

Q is a bond or —$SO_2$—N(R)—, wherein R is alkyl having from 1 to 4 carbon atoms; and m is an integer from 1 to 11, a second divalent unit comprising a poly(alkyleneoxy) group; and a third divalent unit comprising a pendant ionic group, the third divalent unit represented by formula:

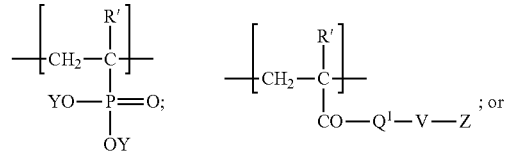

-continued

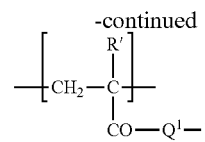
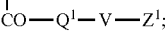

wherein
- Q¹ is selected from the group consisting of —O—, —S—, and —N(R⁷)—;
- each R⁷ is independently selected from the group consisting of hydrogen and alkyl having from 1 to 4 carbon atoms;
- each R' is independently hydrogen or methyl;
- V is alkylene that is optionally interrupted by at least one ether linkage or amine linkage;
- Z is selected from the group consisting of —P(O)(OY)₂, —O—P(O)(OY)₂, and —SO₃Y;
- each Y is independently selected from the group consisting of hydrogen, a counter cation, and a bond to the hydrocarbon-bearing formation;
- Z¹ is selected from the group consisting of —[N(R⁸)₃]⁺M⁻, —N⁺(R⁸)₂—(CH₂)_g—SO₃Y¹, and —N⁺(R⁸)₂—(CH₂)_g—CO₂Y¹, wherein
- each R⁸ is independently selected from the group consisting of hydrogen and alkyl having from 1 to 6 carbon atoms;
- each g is independently an integer from 2 to 6;
- M⁻ is a counter anion; and
- Y¹ is selected from the group consisting of hydrogen and a free anion, wherein at least one of the following conditions is met:
  the solvent comprises not more than ten percent by weight methanol and not more than 25 percent by weight water, based on the total weight of the solvent; or
  the solvent solubilizes or displaces brine in the hydrocarbon-bearing formation.

2. The method of claim 1, wherein the second divalent unit is present in an amount of at least 30 percent by weight, based on the total weight of the fluorinated polymer.

3. The method of claim 1, wherein Q is —SO₂N(R)— and R is methyl or ethyl.

4. The method of claim 1, wherein Rf represents a fluoroalkyl group having up to 4 carbon atoms.

5. The method of claim 1, wherein the fluorinated polymer further comprises at least one divalent unit represented by formula:

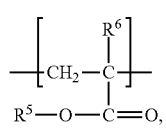

wherein
- each R⁵ is independently alkyl having from 1 to 30 carbon atoms; and
- each R⁶ is independently hydrogen or methyl.

6. The method of claim 1, wherein at least one of the second divalent units is represented by formula:

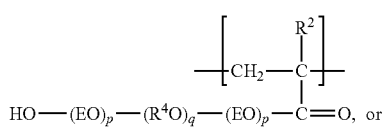

wherein
- each R2 is independently hydrogen or methyl;
- each R3 is independently alkyl having up to 4 carbon atoms or hydrogen;
- EO represents —CH₂CH₂O—;
- each R⁴O is independently selected from the group consisting of —CH(CH₃)CH₂O—, —CH₂CH₂CH₂O—, —CH₂CH(CH₃)O—, —CH₂CH₂CH₂CH₂O—, —CH(CH₂CH₃)CH₂O—, —CH₂CH(CH₂CH₃)O—, and —CH₂C(CH₃)₂O—;
- each p is independently a value from 0 to 150; and
- each q is independently a value from 0 to 150, wherein p+q is at least 5.

7. The method of claim 1, wherein at least one of the second divalent units is represented by formula:

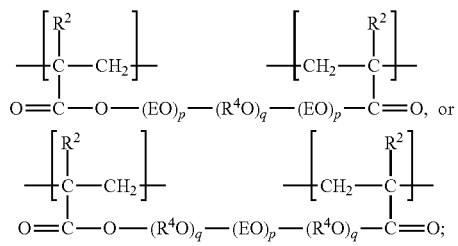

wherein
- each R₂ is independently hydrogen or methyl;
- EO represents —CH₂CH₂O—;
- each R⁴O is independently selected from the group consisting of —CH(CH₃)CH₂O—, —CH₂CH₂CH₂O—, —CH₂CH(CH₃)O—, —CH₂CH₂CH₂CH₂O—, —CH(CH₂CH₃)CH₂O—, —CH₂CH(CH₂CH₃)O—, and —CH₂C(CH₃)₂O—;
- each p is independently a value from 0 to 150; and
- each q is independently a value from 0 to 150, wherein p+q is at least 5.

8. The method of claim 1, wherein at least one of the third divalent units is represented by formula:

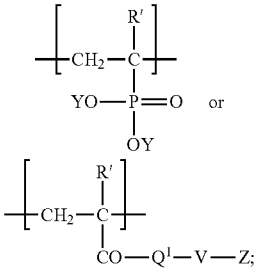

wherein
- Q¹ is selected from the group consisting of —O—, —S—, and —N(R⁷)—;
- each R⁷ is independently selected from the group consisting of hydrogen and alkyl having from 1 to 4 carbon atoms;

each R' is independently hydrogen or methyl;
V is alkylene that is optionally interrupted by at least one ether linkage or amine linkage;
Z is selected from the group consisting of —P(O)(OY)$_2$, —O—P(O)(OY)$_2$, and —SO$_3$Y; and
each Y is independently selected from the group consisting of hydrogen, a counter cation, and a bond to the hydrocarbon-bearing formation.

9. The method of claim 1, wherein at least one of the third divalent units is represented by formula:

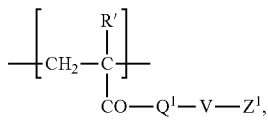

wherein
Q$^1$ is selected from the group consisting of —O—, —S—, and —N(R$^7$)—;
each R$^7$ is independently selected from the group consisting of hydrogen and alkyl having from 1 to 4 carbon atoms;
each R' is independently hydrogen or methyl;
V is alkylene that is optionally interrupted by at least one ether linkage or amine linkage; and
Z$^1$ is selected from the group consisting of —[N(R$^8$)$_3$]$^+$M$^-$, —N$^+$(R$^8$)$_2$—(CH$_2$)$_g$—SO$_3$Y$^1$, and —N$^+$(R$^8$)$_2$—(CH$_2$)$_g$—CO$_2$Y$^1$, wherein
each R$^8$ is independently selected from the group consisting of hydrogen and alkyl having from 1 to 6 carbon atoms;
each g is independently an integer from 2 to 6;
M$^-$ is a counter anion; and
Y$^1$ is selected from the group consisting of hydrogen and a free anion.

10. The method of claim 1, wherein the hydrocarbon-bearing formation comprises at least one of limestone, dolomite, sandstone, shale, conglomerate, diatomite, or sand.

11. The method of claim 1, wherein the hydrocarbon-bearing formation has at least one fracture, and wherein the fracture has a plurality of proppants therein.

12. The method of claim 1, wherein the solvent comprises at least one of water, an alcohol, an ether, or a ketone, wherein the alcohol, ether, and ketone each independently have up to 4 carbon atoms.

13. The method of claim 1, wherein the solvent comprises at least one of a polyol or polyol ether independently having from 2 to 25 carbon atoms.

14. The method of claim 1, further comprising contacting the hydrocarbon-bearing formation with a fluid before contacting the hydrocarbon-bearing formation with the treatment composition, wherein the fluid at least one of solubilizes or displaces at least one of the brine or liquid hydrocarbons in the hydrocarbon-bearing formation.

15. The method of claim 11, wherein the plurality of proppants comprises ceramic proppants.

16. The method of claim 1, wherein the second divalent unit comprises a pendant poly(alkyleneoxy) group.

17. The method of claim 1, wherein the fluorinated polymer is free of divalent units comprising a pendant silane group and free of silane terminal groups.

18. The method of claim 1, wherein before contacting the hydrocarbon-bearing formation with the treatment composition, the hydrocarbon-bearing formation has at least one of brine or liquid hydrocarbons, and wherein the hydrocarbon-bearing formation has at least a gas permeability that is increased after it is contacted with the treatment composition.

19. The method of claim 1, wherein the fluorinated polymer is a polymer having a weight average molecular weight in a range from 1,000 grams per mole to 100,000 grams per mole.

20. The method of claim 1, wherein at least one of the third divalent units is represented by formula:

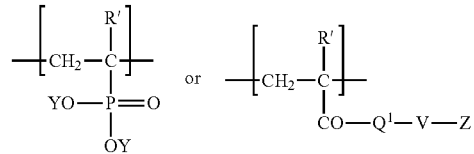

wherein
Q$^1$ is selected from the group consisting of —O—, —S—, and —N(R$^7$)—;
each R' is independently hydrogen or methyl;
V is alkylene that is optionally interrupted by at least one ether linkage or amine linkage;
Z is selected from the group consisting of —P(O)(OY)$_2$ and —O—P(O)(OY)$_2$; and
each Y is independently selected from the group consisting of hydrogen, a counter cation, and a bond to the hydrocarbon-bearing formation.

* * * * *